US010890165B2

(12) United States Patent
Heathcoat et al.

(10) Patent No.: US 10,890,165 B2
(45) Date of Patent: Jan. 12, 2021

(54) CONTROLLER AND SYSTEM FOR UTILITY VEHICLE

(71) Applicant: Parker-Hannifin Corporation, Cleveland, OH (US)

(72) Inventors: David Mark Heathcoat, Greenville, TN (US); Kirk Ayres Lola, Rutherfordton, NC (US); Roger Paul Gray, II, Greenville, TN (US); Kerry Brock, Forest City, NC (US); Michael T. Crosby, Jonesborough, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 579 days.

(21) Appl. No.: 15/364,656

(22) Filed: Nov. 30, 2016

(65) Prior Publication Data

US 2017/0082093 A1 Mar. 23, 2017

Related U.S. Application Data

(63) Continuation of application No. 14/699,245, filed on Apr. 29, 2015, now abandoned.

(60) Provisional application No. 61/985,604, filed on Apr. 29, 2014.

(51) Int. Cl.
| *F04B 1/295* | (2020.01) |
| *B62D 3/14* | (2006.01) |
| *B62D 6/02* | (2006.01) |
| *F16H 63/50* | (2006.01) |
| *F16H 61/47* | (2010.01) |
| *F16H 61/431* | (2010.01) |
| *B60T 13/16* | (2006.01) |
| *F04B 1/146* | (2020.01) |

(52) U.S. Cl.
CPC .............. *F04B 1/295* (2013.01); *B60T 13/16* (2013.01); *B62D 3/14* (2013.01); *B62D 6/02* (2013.01); *F04B 1/146* (2013.01); *F16H 61/431* (2013.01); *F16H 61/47* (2013.01); *F16H 63/50* (2013.01); *B60Y 2200/223* (2013.01)

(58) Field of Classification Search
CPC ........ F04B 1/295; F04B 1/146; F16H 61/431; F16H 61/47; F16H 63/50; B60T 13/16; B62D 3/14; B62D 6/02
See application file for complete search history.

(56) References Cited

U.S. PATENT DOCUMENTS

| 5,316,097 | A | 5/1994 | Meyer |
| 5,540,051 | A | 7/1996 | Maruyama |
| 5,671,137 | A | 9/1997 | Ishino |
| 6,260,440 | B1 | 7/2001 | Cronin |
| 6,427,107 | B1 | 7/2002 | Chiu |
| 6,616,559 | B1 | 9/2003 | Hori |

(Continued)

*Primary Examiner* — Erez Gurari
(74) *Attorney, Agent, or Firm* — Renner, Otto, Boisselle & Sklar, LLP

(57) ABSTRACT

A vehicle includes a pump having a swash plate tiltable about a swashplate tilt axis, wherein rotation of the swashplate changes the title angle and effects a change in volumetric displacement of the pump. A controller is operatively coupled to the swashplate to effect rotation of the swashplate, the controller including a processor and memory, and logic stored in the memory and executable by the processor, the logic configured to automatically control at least one vehicle characteristic independent of a user input command.

14 Claims, 19 Drawing Sheets

(56) References Cited

U.S. PATENT DOCUMENTS

| | | |
|---|---|---|
| 7,275,355 B2 | 10/2007 | Adams |
| 7,381,150 B2 | 6/2008 | Viergever |
| 7,395,142 B2 | 7/2008 | Mori |
| 7,395,887 B2 | 7/2008 | Viergever |
| 7,503,173 B2 | 3/2009 | Dong |
| 7,860,631 B2 | 12/2010 | Williams |
| 9,550,490 B2 * | 1/2017 | Guo ............... B60W 10/04 |
| 2014/0188354 A1 | 7/2014 | Guo |

* cited by examiner

CONTROLLER AND SYSTEM FOR UTILITY VEHICLE

RELATED APPLICATION DATA

This application is a continuation of U.S. patent application Ser. No. 14/699,245 filed on Apr. 29, 2015, which claims priority of U.S. Provisional Application No. 61/985,604 filed on Apr. 29, 2014, each of which is incorporated herein by reference in its entirety.

FIELD OF THE INVENTION

The present invention relates generally to hydrostatic transmissions, and more particularly to control systems for hydrostatic transmissions.

BACKGROUND

Hydrostatic transmissions are well known and generally include a hydraulic pump and a hydraulic motor. The hydraulic pump and the hydraulic motor may be arranged as separate components or may be combined together in an integral unit. Axial swashplate type hydraulic piston pumps are frequently used in many such hydrostatic transmissions. Such pumps generate a pump action by causing pistons to reciprocate within a piston bore, with reciprocation of the pistons being caused by a swashplate that the pistons act against as a cylinder barrel containing the pistons rotates. Pump fluid output flow or displacement for each revolution of the barrel depends on the bore size and the piston stroke as well as the number of pistons that are utilized. The swashplate can pivot about a swashplate pivot center or axis, and the swashplate pivot angle determines the length of the piston stroke. By changing the swashplate angle, the pump displacement can be changed as is known in the art.

With the swashplate at its extreme pivot angle relative to the axis of rotation of the barrel, a maximum fluid displacement is achieved. When the swashplate is centered at a right angle relative to the axis of rotation of the barrel, the pistons will not reciprocate and the displacement of the pump will be substantially zero. In some axial swashplate type piston pump designs, the swashplate has the capability of crossing over center which results in the pump displacement being generated at opposite ports. In an over center swashplate axial piston pump, each system port can be either an inlet or an outlet port depending on the pivot angle of the swashplate. Over center axial swashplate piston pumps are widely used in hydrostatic transmissions, to provide driving in both forward and reverse directions.

One use for hydrostatic transmissions is zero turn vehicles such as zero turn lawn mowers. A separate over center swashplate axial piston pump may drive a hydraulic motor and wheel on each side of the vehicle. When the swash plate angles of the two pumps are equal and the output flow rotates the wheels in the same direction at the same speed, the vehicle travels in a substantially straight line path in either the forward or the reverse direction. When the swash plate angles of the two pumps are not equal and the output flow rotates the wheels in the same direction but at different speeds, the output flow rotates one wheel faster than the other so that the vehicle will turn. When one of the pumps is rotating its associated wheel in one direction and the other pump is rotating its associated wheel in the other direction, the vehicle will make a zero radius turn. An operator interface allows the vehicle operator to control the swashplate angles of the separate over center swashplate axial piston pumps, to control straight line or turning or zero radius turns for the vehicle.

SUMMARY OF INVENTION

The present disclosure provides a system and method for controlling a hydraulic pump system. A swashplate type axial piston hydraulic pump may have a swashplate tiltable about a swashplate tilt axis, a barrel with axial pistons disposed in the barrel, the barrel and pistons being rotatable about a barrel rotation axis relative to the swashplate, the pistons each being moveable relative to the barrel along a straight line piston path, and the pistons having a stroke determined by the position of the swashplate. A fluid-powered actuator may be drivingly connected to the swashplate for displacing the swashplate about the swashplate tilt axis in response to fluid power provided thereto. An electrical controller may generate electrical command signals in response to controller inputs, and communicate such control signals to a fluid power control device. The fluid power control device is responsive to the control signals to vary fluid power provided to the actuator and thus change a tilt angle of the swashplate.

In addition, the present disclosure further provides enhanced control methods for a utility vehicle, such as a vehicle employing a hydrostatic transmission. More particularly, a speed of an implement, such as a blade, may be maintained at an optimal speed. In this regard, a speed of a prime mover that powers the implement maybe varied to obtain optimal implement speed, and/or a mechanical ratio between the prime mover and the implement may be varied to obtain optimum implement speed. Other features include four-wheel steering, optimal operating point control (e.g., operating the prime mover at the optimal operating speed and controlling speed by varying a ratio of a mechanical coupling between the prime mover and, for example, an implement), cruise control and ground speed range control (e.g., altering speed control resolution).

According to one aspect of the invention, a vehicle includes: a pump including a swashplate tiltable about a swashplate tilt axis, wherein rotation of the swashplate changes a title angle of the swashplate and effects a change in volumetric displacement of the pump; a controller operatively coupled to the swashplate to effect rotation of the swashplate, the controller comprising a processor and memory; a first input for receiving a user-controlled speed setpoint; a second input for receiving user-selected operating modes of the vehicle; an output for providing a vehicle speed reference to control a speed of the vehicle; and logic stored in the memory and executable by the processor, the logic configured to alter a resolution of at least one of the user-controlled speed setpoint or the vehicle speed reference based on the user-selected operating modes of the vehicle.

In one embodiment, the logic configured to alter the resolution includes logic configured to apply a scale factor to at least one of the user-controlled speed setpoint or the vehicle speed reference.

In one embodiment, the logic configured to alter the resolution includes logic configured to increase a maximum speed of the vehicle and decrease a sensitivity of the first input when in a first mode of the user-selected operating modes, and decrease a maximum speed of the vehicle and increase the sensitivity of the first input when in a second mode of the user-selected operating modes.

In one embodiment, the vehicle includes a speed input device operatively coupled to the first input, the speed input device operative to generate a signal corresponding to a displacement of the speed input device.

In one embodiment, the speed input device comprises one of a foot-operated pedal or a hand-operated lever.

In one embodiment, the vehicle includes a mode control input device operatively coupled to the second input, the mode control input device operative to generate signals corresponding to the operating modes of the vehicle.

In one embodiment, the mode control device comprises one of a selector switch, a push button or an operator interface.

In one embodiment, the controller is configured to effect rotation of the swashplate through application of fluid power to the swashplate.

In one embodiment, the vehicle includes logic configured to automatically control a wheel speed of the vehicle independent of the user-controlled speed setpoint.

In one embodiment, the logic configured to automatically control wheel speed of the vehicle includes logic configured to detect a turning or braking operation of the vehicle; control a wheel speed of the vehicle based on the user-controlled speed setpoint during a turning or braking operation; and control a wheel speed of the vehicle independent of the user-controlled speed setpoint absent a turning and braking operation.

In one embodiment, the vehicle includes: a first driven wheel arranged on a first side of the vehicle; a second driven wheel arranged on a second side of the vehicle; at least one steerable wheel; at least one steering attitude sensor coupled to the at least one steerable wheel and to the controller, the attitude sensor operative to communicate a steering attitude of the at least one wheel to the controller; and at least one steering actuator operatively coupled to the at least one steerable wheel and to the controller, logic configured to command the at least one steering actuator to turn the at least one steerable wheel based on a speed differential between the at least two driven wheels and data provided by the steering attitude sensor.

In one embodiment, the at least one steerable wheel comprises a plurality of steerable wheels, each wheel operatively coupled to a respective steering actuator and attitude sensor.

In one embodiment, the vehicle includes a hydrostatic transmission.

According to another aspect of the invention, a controller is provided for operating a vehicle including a pump having a swashplate tiltable about a swashplate tilt axis, wherein rotation of the swashplate changes the title angle and effects a change in volumetric displacement of the pump. The controller includes: a processor and memory; a first input for receiving a user-controlled speed setpoint; a second input for receiving user-selected operating modes of the vehicle; an output for providing a vehicle speed reference to control a speed of the vehicle; and logic stored in the memory and executable by the processor, the logic configured to alter a resolution of at least one of the user-controlled speed setpoint or the vehicle speed reference based on the user-selected operating modes of the vehicle.

In one embodiment, the controller includes logic configured to automatically control a wheel speed of the vehicle independent of the user command.

In one embodiment, the logic configured to automatically control wheel speed of the vehicle includes logic configured to detect a turning or braking operation of the vehicle; control a wheel speed of the vehicle based on the user-controlled speed setpoint during a turning or braking operation; and control a wheel speed of the vehicle independent of the user-controlled speed setpoint absent a turning and braking operation.

In one embodiment, the controller includes logic configured to command at least one steering actuator to turn at least one steerable wheel based on a speed differential between at least two driven wheels and data provided by a steering attitude sensor.

The foregoing and other features of the invention are hereinafter described in greater detail with reference to the accompanying drawings.

DETAILED DESCRIPTION

Aspects of the present invention will now be described in the context of a hydrostatic transmission of a zero-turn-radius mower. It should be appreciated, however, that aspects of the invention are applicable to other applications in which a hydrostatic transmission is utilized.

Figure 1:
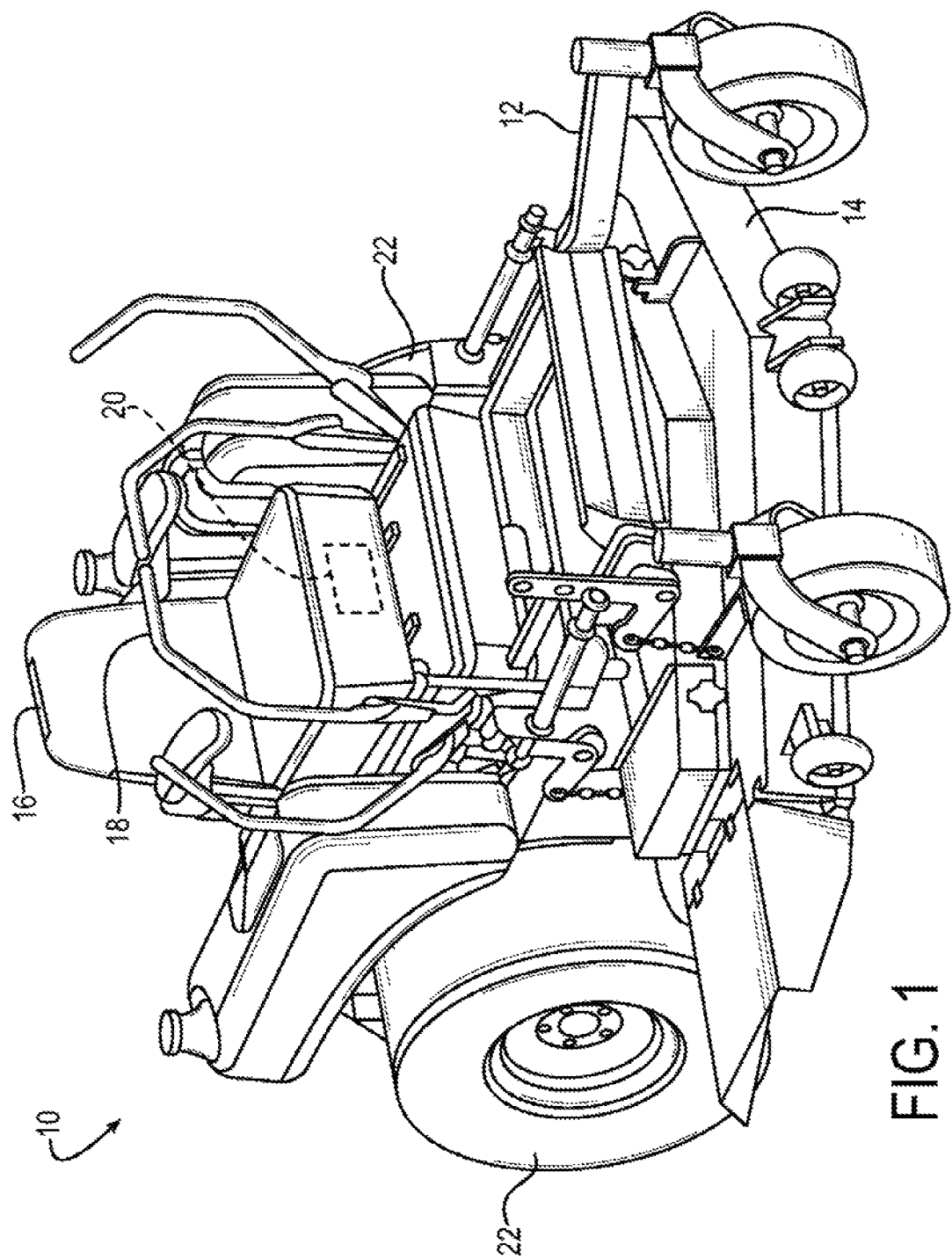
FIG. 1 is a perspective view of an exemplary zero-turn-radius mower employing a hydrostatic transmission to which the principles of the invention can be applied, as discussed below.

Referring now to the drawings in detail, and initially to FIG. 1, an exemplary zero-turn-radius mower 10 is illustrated. It is noted that the design of the illustrated mower 10 is merely exemplary in nature, and it will be appreciated that other mower designs and vehicle types can be used in accordance with the invention.

The mower 10 includes a frame 12, a mower deck 14 supported by the frame 12 for mowing grass, an operator seat 16, and a plurality of controls 18 for operating the mower 10. A rear mounted engine attached to the frame 12 behind the seat 16 provides power to left and right hydrostatic transmissions also mounted to the frame 12 (the engine and hydrostatic transmissions are not shown in FIG. 1). As will be described in more detail below, each hydrostatic transmission includes a hydraulic pump having a swashplate, the swashplate operative to vary a volumetric displacement of the respective hydraulic pump.

A controller 20 is attached to the frame 12 and preferably located in an enclosure or other protected area. In the embodiment shown in FIG. 1 the controller 20 is located under the seat 16, although other locations are contemplated. As will be described in more detail below, the controller 20 is operatively coupled to the plurality of controls 18 and to the swashplate of each hydrostatic transmission. Based on commands received from the controls 18, the controller 20 can control the hydrostatic transmissions to independently drive respective rear wheels 22 to propel the mower and provide zero-turn-radius functionality.

Figure 2:
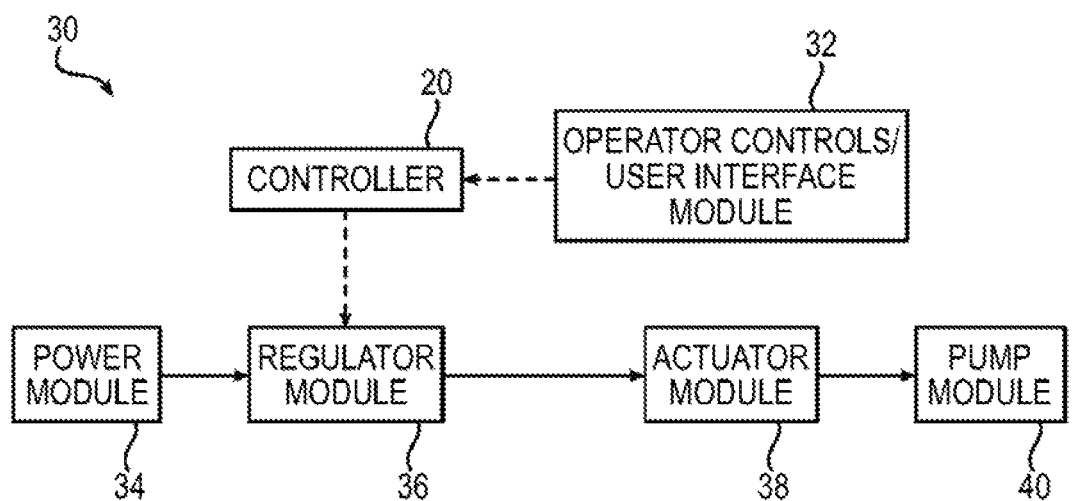
FIG. 2 is a block diagram of an exemplary control system in accordance with aspects of the present invention.

With reference to FIG. 2, a block diagram is provided illustrating the general architecture of a control system 30 in accordance with the present invention. More specifically, the system 30 includes the aforementioned controller 20, which can include a processor for executing instructions and a storage device, such as memory, for storing instructions executable by the processor. Alternatively, the controller 20 may be in the form of a dedicated circuit, such as an application-specific integrated circuit (ASIC) or other custom circuit.

The controller 20 is operatively coupled to a user interface module 32 (also referred to as an input device) to receive inputs for operating the mower 10. Generally, the user interface module 32 converts operator commands into signals that can be read by the controller 20. Thus, for example, the user interface module 32 can include the plurality of operator controls 18 and sensing devices operatively coupled thereto, the sensing devices operative to convert, for example, linear or rotary motion into signals readable by the controller 20 (e.g., analog voltage or current signals, digital signals, etc.). The signals provided to the controller 20 may correspond to a desired output characteristic of the hydrostatic transmission (e.g., speed, power, torque, swashplate position, etc.).

Exemplary operator controls include a steering wheel, pedals, lap bars, joysticks and the like, while exemplary sensors include potentiometers, encoders, resolvers, and the like. The operator controls 18 may also include devices that provide binary on/off data, e.g., selector switches, pushbuttons and the like. Based on data received by the controller 20 from the user interface module 32, the controller 20 generates a control signal for regulating a position of a swashplate of the hydrostatic transmission.

A power module 34 provides fluid or electric power to the system. In some embodiments the power module 34 may be fluid power provided by a pump (e.g., pneumatic or hydraulic power). In other embodiments the power module 34 may provide electric power. Power provided by the power module 34 is provided to a regulator module 36.

The regulator module 36 receives the power provided from the power module 34 and the control signal from the controller 20. Based on the control signal from the controller 20, the regulator module 36 modulates the power (e.g., pressure or voltage) at its output and provides the modulated power to an actuator module 38. The actuator module 38 includes an actuator, such as a pneumatic, hydraulic or electric actuator, which may be in the form of a linear or rotary actuator. Modulation of the power provided to the actuator module 38 produces a desired displacement of the actuator.

A pump module 40 includes a hydraulic pump having a rotatable swashplate to vary displacement of the pump, the swashplate being operatively coupled to the actuator of the actuator module 26. By virtue of the coupling between the actuator and the swashplate, displacement of the actuator also effects angular displacement of the swashplate.

Accordingly, pump displacement (and thus power output by each hydrostatic transmission) is electronically controlled by the controller 20. Such control by the controller 20 is advantageous in that it enables rotation of the swashplate independent of a user-supplied command. Independent control can be useful for implementing custom control modes for the mower 10, such as cruise control, optimal implement speed control, four-wheel steering control, etc.

Figure 3:
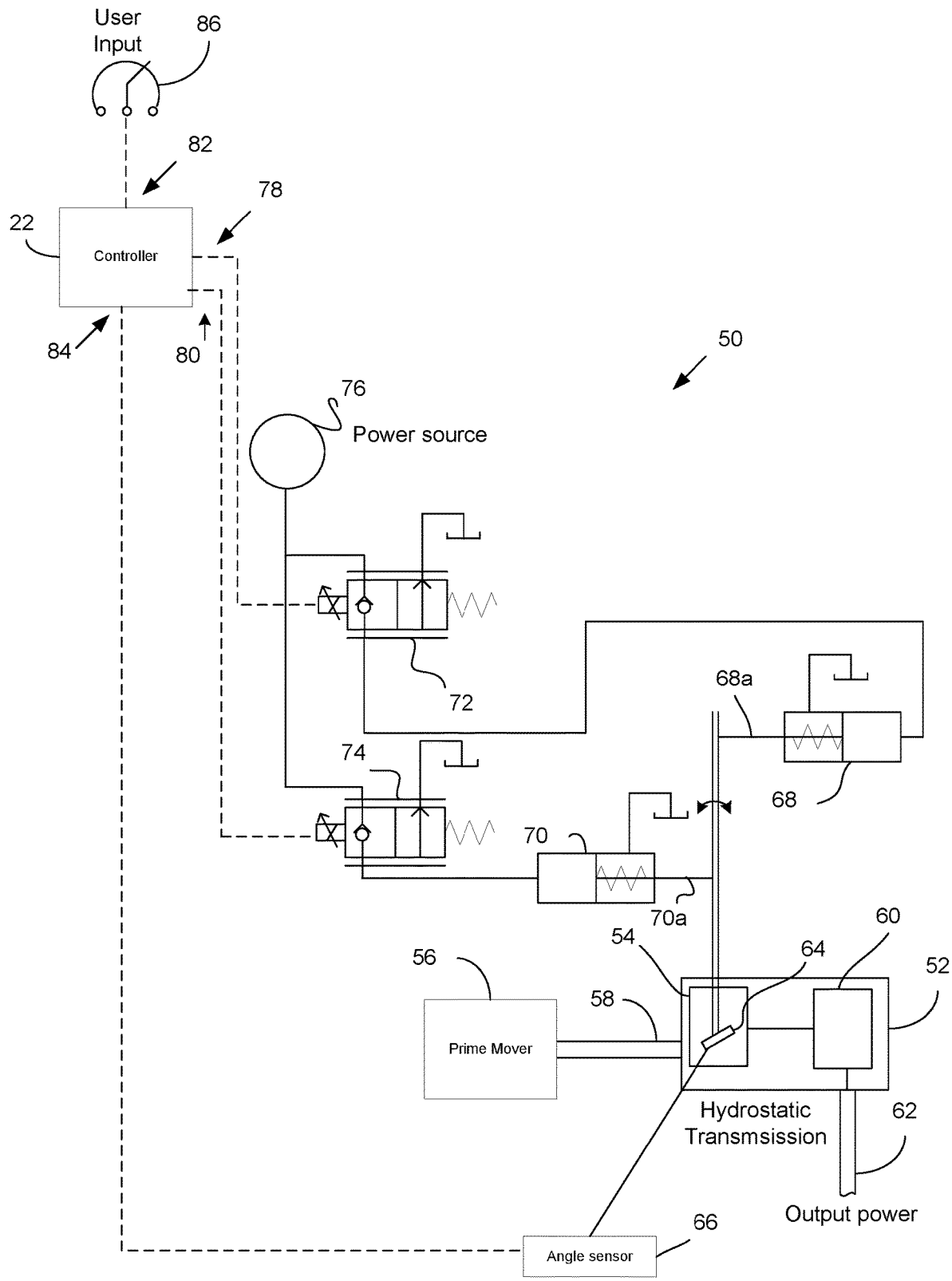
FIG. 3 is a schematic diagram of an exemplary control system in accordance with an embodiment of the present invention.

With additional reference to FIG. 3, a schematic representation of a control system 50 in accordance with FIG. 2 is shown for a system using hydraulically actuated swashplate. While a hydraulic system is illustrated in FIG. 3, it should be appreciated that other types of fluid power may be utilized without departing from the scope of the invention. For example, instead of hydraulic power the system may utilize pneumatic power.

As shown in FIG. 3 a hydrostatic transmission 52 includes a variable displacement hydraulic pump 54 for generating hydraulic power used by the hydrostatic transmission 52. The hydraulic pump 54 may be driven by a prime mover 56, such as an internal combustion engine, an electric motor or the like via drive system 58 (e.g., belt drive, chain drive, gear drive, etc.). Hydraulic power generated by the pump 54 is provided to a hydraulic motor 60 of the hydrostatic transmission 52 via ports, conduits and/or lines (not shown) within the hydrostatic transmission 52. The hydraulic motor 60 converts the hydraulic power received from the pump 54 into rotational power, which is provided at the output shaft 62 for driving wheels 22.

The hydraulic pump 54 includes a rotatable swashplate 64, where variation of the angular position of the swashplate 64 varies its tilt angle and thus displacement of the pump 54 (e.g., between a minimum displacement (e.g., approximately 0%) and a maximum displacement (e.g., 100%)). An angle sensor 66 monitors the swashplate 64 to detect an angular position of the swashplate 64. The sensor 66 may be in the form of an encoder, a resolver, a Hall Effect sensor or other suitable sensor for detecting angular position or displacement. The sensor may directly monitor position of the swashplate 66, or indirectly monitor the position of the swashplate (e.g., via a trunnion shaft).

Operatively coupled to the swashplate 64 are first and second hydraulic cylinders 68 and 70. The cylinders 68 and 70 may be indirectly coupled to the swashplate 64. For example, the swashplate 64 may include a trunnion shaft 73 that effects rotation of the swashplate, the trunnion shaft being coupled to the cylinders 68 and 70 via arms 68a and 70a. Alternatively, the cylinders 68 and 70 may be directly coupled to the swashplate 64. Linear displacement of the first cylinder 68 effects rotation of the swashplate 64 in a first direction, and linear displacement of the second cylinder 70 effects rotation of the swashplate 64 in a second direction opposite from the first direction.

The first and second cylinders 68 and 70 are in fluid communication with first and second fluid power control devices 72 and 74, respectively. First and second fluid power control devices 72 and 74, which in the present example are two-way valves, receive hydraulic power from a hydraulic power source 76, such as a fixed-displacement pump driven by the prime mover 56. While the exemplary embodiment utilizes two-way valves, other devices may be used, e.g., three-way valves.

Figure 4:
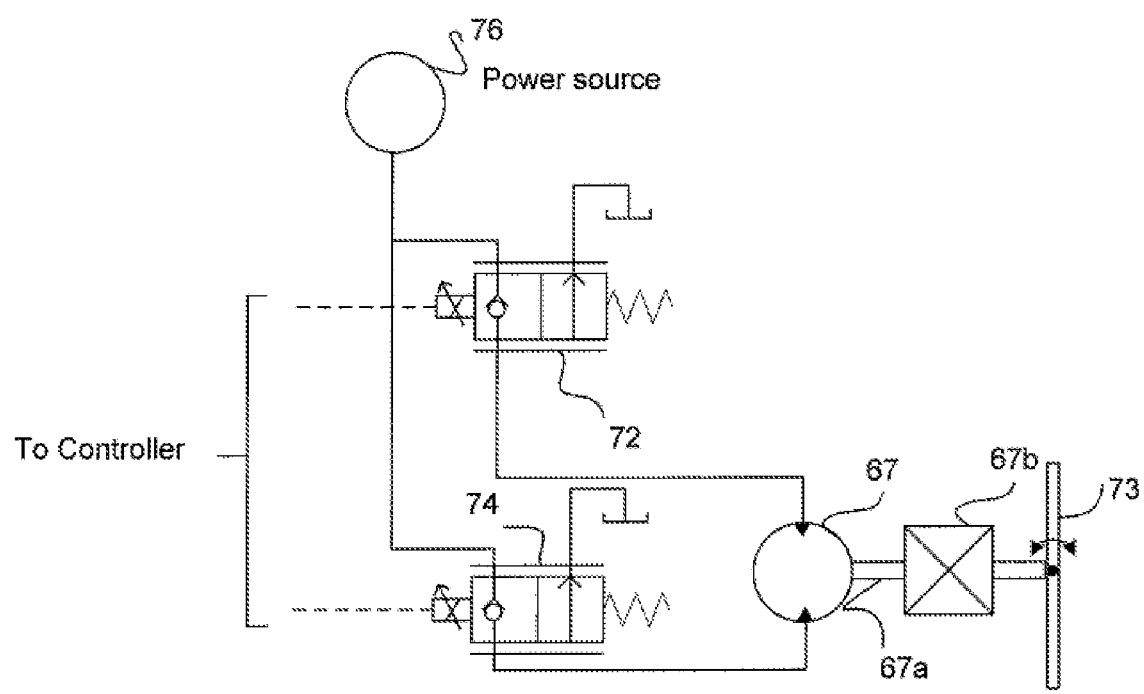
FIG. 4 is a schematic diagram illustrating a fluid-powered rotary actuator that may be used in a control system in accordance with the present invention.

Although linear actuators are described in the present embodiment, other types of actuators may be used without departing from the scope of the invention. For example, instead of linear actuators, rotary actuators may be utilized. Briefly, FIG. 4 illustrates use of rotary actuators in a hydraulic system. The system is similar to the hydraulic portion of FIG. 3, except the first and second actuators 68 and 70 are replaced with a rotary hydraulic actuator 67. In response to hydraulic power provided by the fluid power control devices 72 and 74 to the rotary actuator 67, rotation of an output shaft 67a in a forward or reverse direction is achieved. The output shaft 67a may be directly coupled to the trunnion shaft 73 of the swashplate 64, or optionally a gearbox 67b may be arranged between the output shaft 67a and the trunnion shaft 73.

Additionally, while not shown in FIG. 3 or 4 the system can include an adjustment device to set a neutral position for the hydraulic actuators. The adjustment device is manipulated during a calibration procedure to return the cylinders 68 and 70 (or rotary actuator 67) to a neutral position and remain in that position during power loss.

The controller 20 includes one or more outputs for providing control signals, status signals, etc. to other devices, such as the fluid power control devices 72 and 74. For example, first and second outputs 78 and 80 of the controller are operatively coupled to the first and second fluid power control devices 72 and 74, respectively, to provide first and second control signals (e.g., analog signals such as 0-10 VDC or 4-20 mA signals) to the respective fluid power control devices 72 and 74. The first and second control signals are proportional to a desired fluid flow through the fluid power control devices, or proportional to a desired fluid pressure at the output of the fluid power control devices. In this regard, 0 VDC (or 4 mA) may correspond to no fluid flow or no pressure, while 10 VDC (or 20 mA) may correspond to 100% fluid flow or 100% pressure. In this manner, the controller 20 can control the delivery of fluid power to the actuators 68 and 70. While analog signals are described in the present example, other signal types may be utilized without departing from the scope of the invention. For example, instead of using outputs embodied as analog outputs, control signals may be communicated to the valves 72 and 74 (or other devices) via a communication bus (e.g., a network). The controller may include additional outputs that may be used by the system, such as wheel speed reference signals, implement speed reference signals, or any other parameter that may be controlled by the controller 20. Such outputs may be used to provide enhanced control functions.

The controller 20 includes one or more inputs for receiving data from other devices, such as the operator controls 18. For example, the controller 20 includes a first input 82 for receiving an input command from a user-operated device, such as a speed command, a power command, a direction command, etc. For sake of clarity only one input is shown for the operator controls. It will be appreciated, however, that the controller 20 may have a plurality of inputs as needed for the respective operator controls. As discussed above, the user operated device may be coupled to a sensor 86 so as to convert linear or rotary motion into a signal readable by the controller 20. The controller 20 also includes a second input 84 communicatively coupled to the angle sensor 66 for receiving data corresponding to an angular position of the swashplate 64. The controller 20 may optionally include other inputs for detecting various parameters, such as, for example, power take off engaged/disengaged, prime mover speed, implement speed, wheel speed, or any other parameter that may be used by the controller 20. The inputs may be analog inputs (e.g., 0-10 VDC, 4-20 mA, etc.), digital inputs, optical inputs, networks, or other conventional means for providing data to the controller 20.

Figure 5:
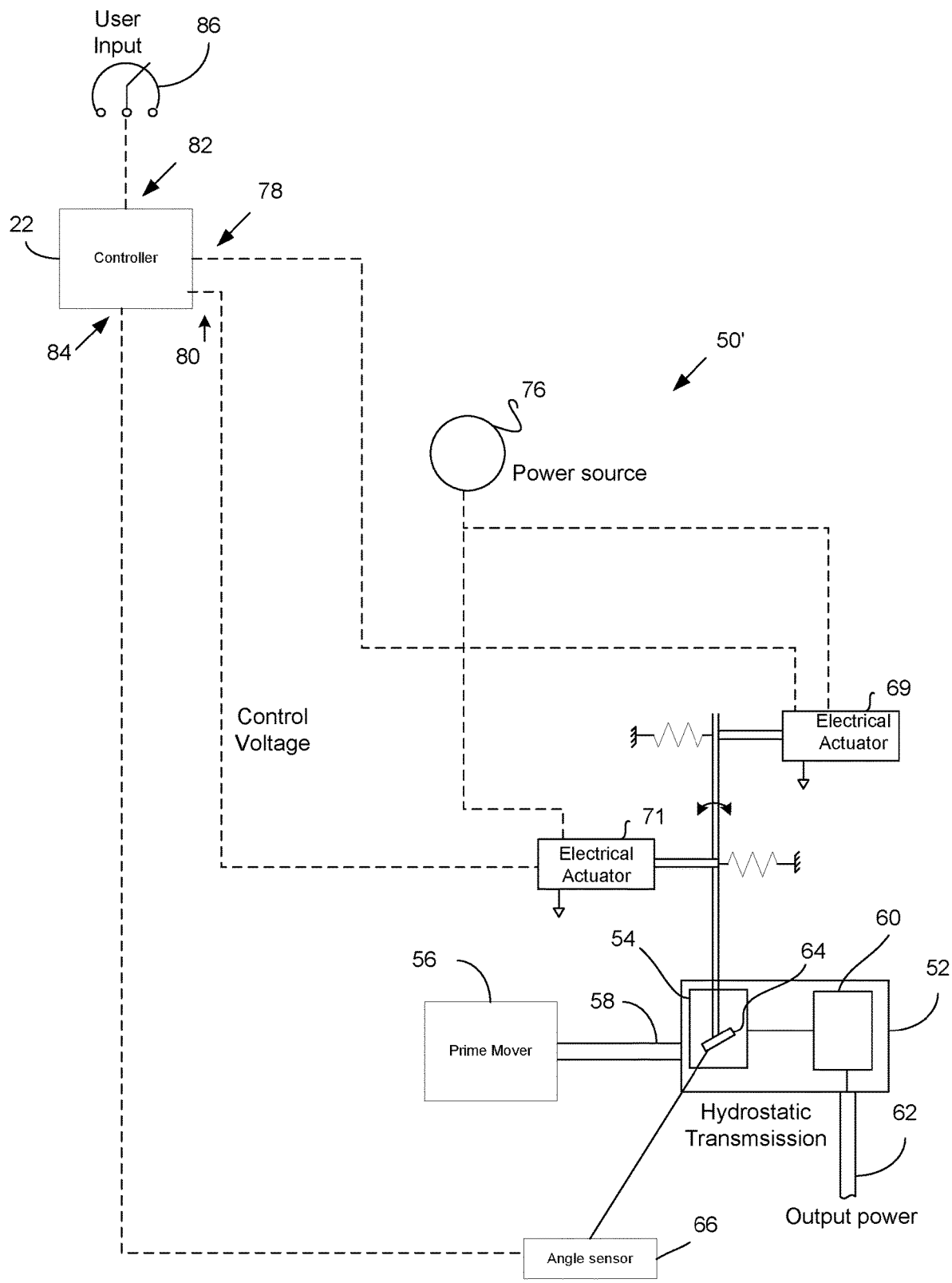
FIG. 5 is a schematic diagram of another exemplary control system in accordance an embodiment of the present invention.

Referring to FIG. 5, another embodiment of a control system 50' in accordance with the present invention is illustrated. The system 50' is similar to the system 50 of FIG. 3, except that electrically-operated actuators are used instead of hydraulically operated actuators. More particularly, the hydrostatic transmission 52 and its subcomponents (hydraulic pump 54 and swashplate 64, hydraulic motor 60), the prime mover 56, drive system 58, angle sensor 66, controller 20 and associated I/O are the same as those in the system of FIG. 3. Therefore, discussion of these components will be omitted for FIG. 5.

The system 50' includes first and second electrically-operated actuators 69 and 71 operatively coupled to the swashplate 64. Stepper motors, servo motors, shape memory alloys and piezoelectric actuators are examples of electrically-operated actuators that may be used in accordance with the present invention. The electrically-operated actuators 69 and 71 may be indirectly coupled to the swashplate 64. For example, the swashplate 64 may include a trunnion shaft 73 that effects rotation of the swashplate 64, the trunnion shaft being coupled to the electrically-operated actuators 69 and 71 via arms 68a and 70a. Alternatively, the electrically-operated actuators 69 and 71 may be directly coupled to the swashplate 64. Linear displacement of the first electrically-operated actuator 69 effects rotation of the swashplate 64 in a first direction, and linear displacement of the second electrically-operated actuator 71 effects rotation of the swashplate 64 in a second direction opposite from the first direction.

While linear electrically-operated actuators are described in the present embodiment, other types of electrically-operated actuators may be used without departing from the scope of the invention. For example, a bi-directional linear actuator or a rotary actuator may be utilized. In one embodiment, the linear actuator is a motor-driven ball-screw arrangement.

The electrically-operated actuators 69 and 71 receive power from an electrical power source 77. The electrical power source 77, for example, may be an alternator or generator driven by the prime mover 56. Alternatively, the electrical power source 77 may be a battery.

The electrically-operated actuators 69 and 71 are operatively coupled to the controller 20 via outputs 78 and 80. The outputs may be analog outputs that provide a voltage or current control signal as described with respect to the embodiment of FIG. 3, a communication network that provides digital control signals to the actuators, or any other means for communicating the control signals to the actuators 69 and 71. Based on the control signals, the electrically operated actuators 69 and 71 rotate the swashplate 64 into any one of a number of different positions.

Regardless of the form of the actuators (i.e., hydraulic or electric), the controller 20 includes logic configured to position the swashplate 64 so as to produce a desired characteristic from the hydrostatic transmission 52 (e.g., output power, output speed, output torque, etc.). The logic may be stored in memory of the controller 20 and executable by a processor of the controller 20. The logic stored in the controller 20 may be configured to control the position of the swashplate 64 independent of a user input command, or based on a user-command provided by the plurality of controls 18. For example, a specific function of the vehicle, such as cruise control, can be executed by the controller 20 to regulate the position of the swashplate to achieve a desired speed, without input from the user. Alternatively or additionally, the plurality of user-operated controls 18, such as a foot-operated pedal, a hand-operated lever, or the like can be operatively coupled to a respective sensor 86 to provide a signal corresponding to displacement of the pedal or lever (or other device). The signal generated by the sensor 86 can be provided to the controller 20 via the first input 82. The controller 20 can equate a low end of the signal range (e.g., 0 VDC, 4 mA) to a first angular position of the swashplate 64 corresponding to minimum pump displacement, and a high end of the signal range (e.g., 10 VDC, 20 mA) to a second angular position of the swashplate 64 corresponding to a maximum pump displacement. The user-input signal may be filtered and scaled as is conventional.

The logic executed by the controller 20 may include a position regulator for controlling a position of the swashplate 64. In this regard, the signal generated from the sensor 86 can be a "reference" position for the swashplate 64, and the signal provided by the angle sensor 66 can be the "actual" position of the swashplate 64. Based on a difference between the reference position and the actual position, the position regulator may generate a control signal, which may be filtered and scaled as is conventional. The control signal may be provided to one of the fluid power control device 72 and 74 (or to the electrically-operated actuators 69 and 71) via the outputs 78 and 80 of the controller 20. In response to the control signal, the fluid power control devices 72 or 74 will alter the fluid flow and/or fluid pressure provided to the actuators 68 or 70, thereby causing actuator displacement and effecting rotation of the swashplate 64. Alternatively, in response to the control signal the electrically-operated actuators 69 and 71 will utilize the electrical power from the power source 77 to produce actuator displacement, thus effecting rotation of the swashplate 64.

Figure 6:
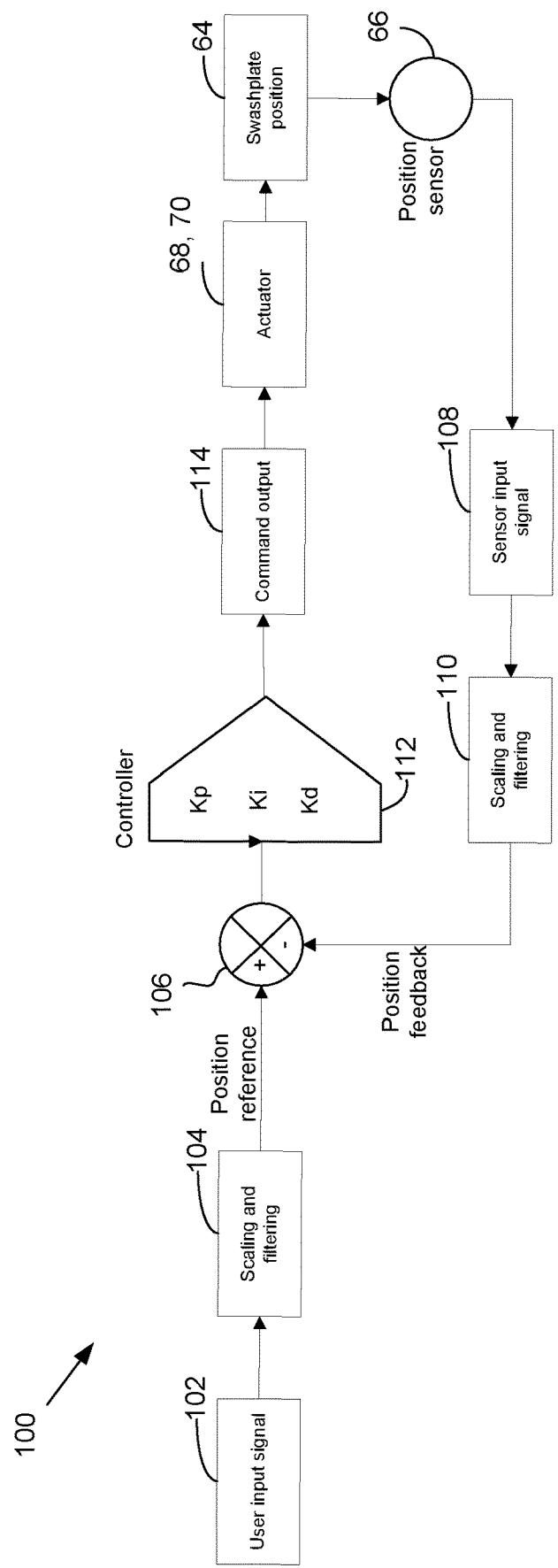
FIG. 6 is a block diagram illustrating an exemplary regulator that can be used to control swashplate position in accordance with the present invention.

With reference to FIG. 6, an exemplary position regulator 100 is illustrated in block form, the position regulator 100 being executable by the controller 20 to control an angular orientation of the swashplate 64. Beginning at block 102, the controller 20 receives the user input signal for controlling a feature of the hydrostatic transmission, e.g., output velocity. The user input signal may be a signal obtained from the user interface module 32. For example, and as described herein, the user may manipulate an operator control 18, which in turn causes a sensor 86 coupled to the operator control 18 to generate a signal. The signal, which may be an analog signal, a digital signal, an optical signal or any other signal readable by the controller 20, preferably is proportional displacement of the respective operator control. The generated signal is read by the controller 20 via an input module corresponding to the type of signal (e.g., an analog voltage signal would be input via an analog voltage input). Next at block 104 the user input signal is optionally scaled and filtered to produce a signal corresponding to the regulated parameter. In the example shown in FIG. 6, the user input signal may be scaled to correspond to the feedback device coupled to the swashplate (i.e., sensor 66). In this regard, the user input signal could be scaled to correspond to swashplate angular orientation. Based on such scaling, the output of block 104 is a position reference signal and is provided to a positive input of summing junction 106.

As described herein, an angular position of the swashplate 64 is detected by sensor 66 and is provided to the controller 20 at block 108. The sensor signal may be analog, digital, optical or any other signal type readable by the controller 20. Next at block 110, the position feedback signal is optionally scaled and filtered to correspond to the position reference signal, and the position feedback signal then is provided to a negative input of summing junction 106. The output of the summing junction is an error signal indicative of the error between the desired position of the swashplate 64 and the actual position of the swashplate 64. The error signal is provided to an input of controller 112, which is shown as a proportional-plus-integral-plus-derivative (PID) controller, although other controllers may be used (e.g., a proportional controller, a proportional-plus-integral controller, etc.).

Based on the error signal the controller 112 generates a control signal, which is output by the controller at block 114 and provided to the actuator (e.g., to one of the fluid power control devices 68 or 70 in FIG. 3 or to one of the electrical actuators 69 and 71 in FIG. 5). In response to the control signal, displacement of the actuator and thus of the swashplate 64 is effected.

While the exemplary embodiment is described in the context of a position regulator, it should be appreciated that other regulation schemes may be employed without departing from the scope of the invention. For example, a speed regulator, torque regulator, power regulator, etc. may be used instead of or in conjunction with the position regulator.

Figure 7:
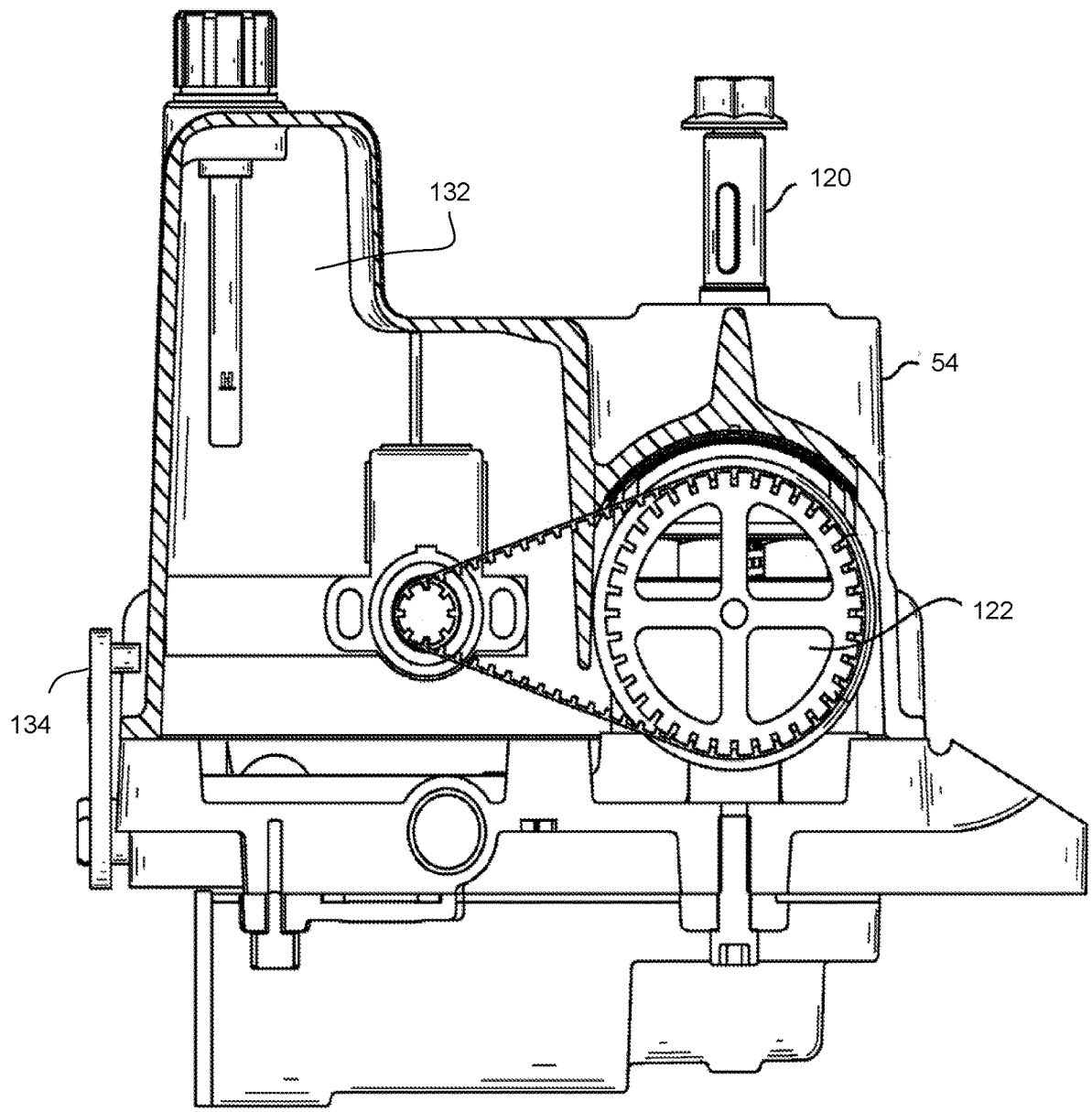
FIG. 7 is a perspective view of certain components of an exemplary pump that may be used in accordance with the present invention.
Figure 8:
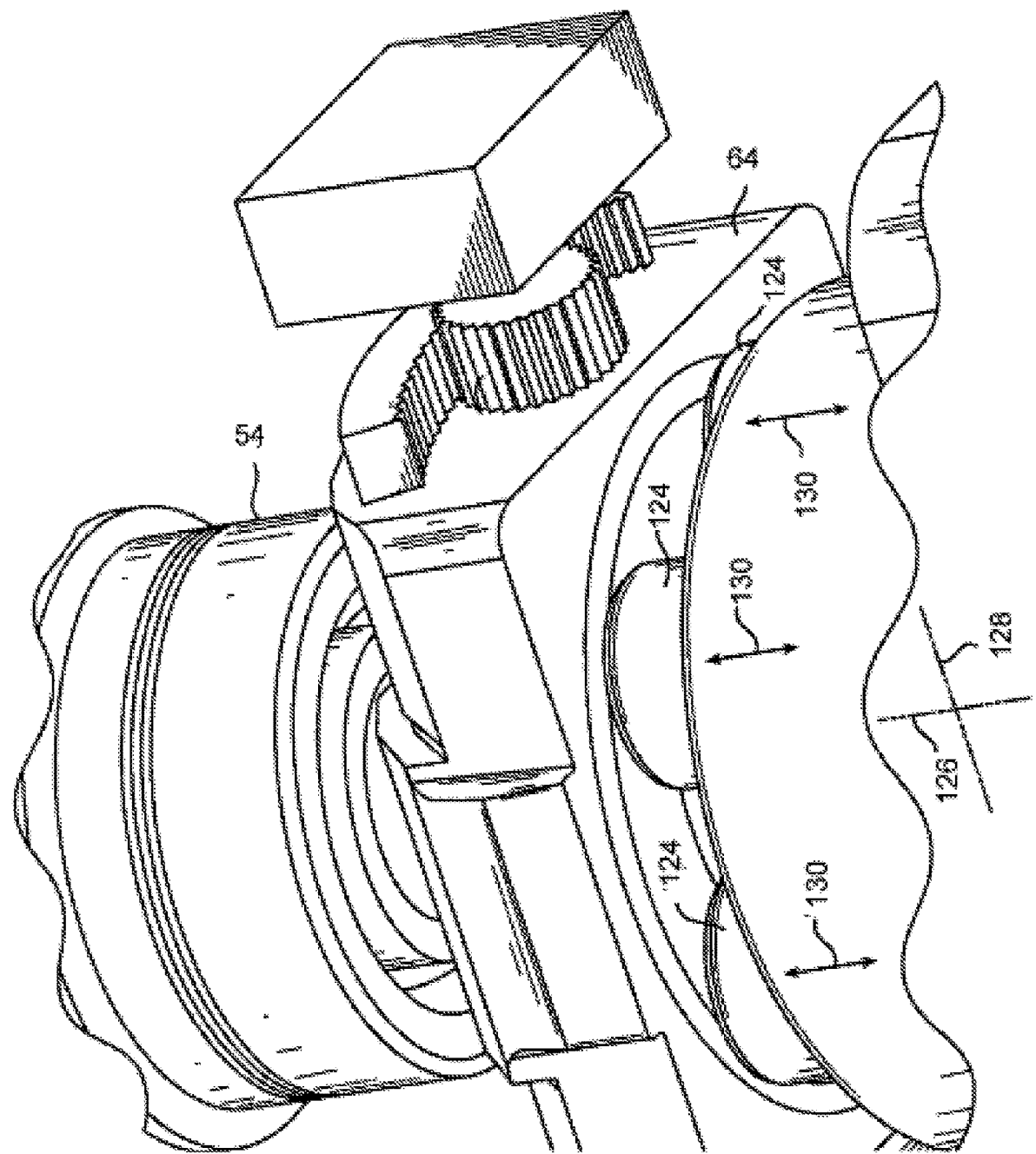
FIG. 8 is an enlarged perspective view of certain other components of an exemplary pump that may be used in accordance with the present invention.

Referring now to FIGS. 7-8, each hydrostatic transmission 52 includes a conventional over center swashplate type axial piston hydraulic pump 54. Pump 54 includes an input 120 that is drivingly connected to prime mover 56 to rotate a pump barrel 122. A plurality of axial pistons 124 are disposed within the pump barrel 122 and rotate with the pump barrel 122 about a barrel axis 126. Pump 54 also includes a conventional over center swashplate 64 which is tiltable about a swashplate tilt axis 128. The pistons 124 are each moveable relative to the barrel along a straight line piston path 130 that is substantially parallel to the barrel rotation axis 126, and the pistons 124 have a stroke determined by the position of the swashplate 64. When the swashplate 64 is in a neutral or center position perpendicular to the barrel axis 126, the stroke of the pistons 124 is substantially zero and the output fluid flow displacement from the pump 54 is substantially zero. When the swashplate 64 begins to be displaced or titled in either direction about its tilt axis 128, the stroke of pistons 124 begins to increase and output fluid flow displacement from the pump 54 begins. As the tilt angle of the swashplate 64 increases, the stroke of pistons 124 increases and the output fluid flow displacement from the pump 54 increases in a known manner. The output fluid flow displacement from pump 54 will be in one direction when the swashplate 64 is tilted in one direction from its neutral position and will be in the other direction when the swashplate 64 is tilted in the opposite direction. The output fluid flow from each pump 54 of each hydrostatic transmission flows through conduits (not shown) to a hydraulic motor 60 (FIG. 3) of each hydrostatic transmission 52, and such output flow rotates its associated hydraulic motor 60 to rotate its associated wheel 22 in the forward or reverse direction in a known manner. A reservoir 132 provides hydraulic fluid to the pump 54, and a lever 134 opens and closes a fluid by-pass route (not shown) to enable pushing vehicle 10 when required.

Figure 9:
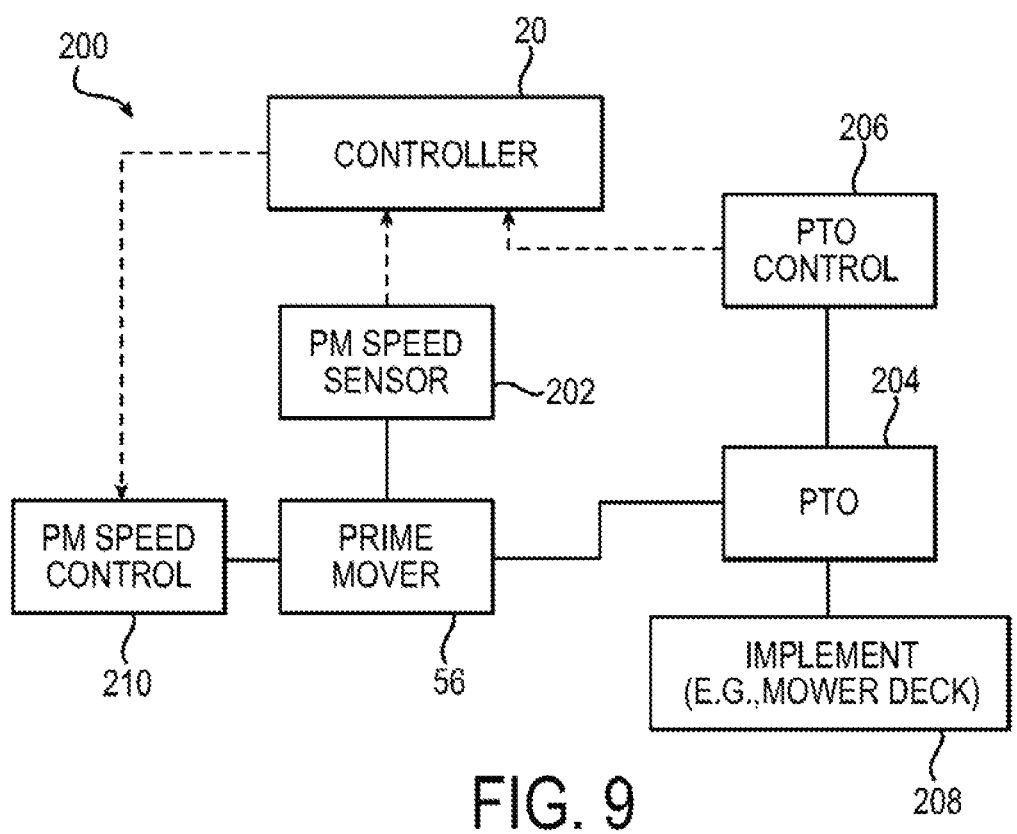
FIG. 9 is a block diagram illustrating exemplary architecture that can be used to implement tip speed control in accordance with one aspect of the disclosure.

Referring now to FIG. 9, there is provided a block diagram illustrating exemplary architecture 200 for a vehicle, such as a zero-turn mower or other utility vehicle, equipped with implement speed control in accordance with the present disclosure. The exemplary vehicle may include a hydrostatic transmission incorporating the pump system described herein.

The vehicle includes a prime mover 56, such as an internal combustion engine, electric motor, or the like for providing power to the vehicle and subsystems. A speed sensor 202, such as a tachometer, encoder, resolver or other speed sensing device, is coupled to the prime mover 56 so as to detect a speed of the prime mover 56. The speed sensor 202, which is also communicatively coupled to the controller 20, converts the sensed speed into a form readable by the controller 20 (e.g., an analog, digital or optical signal). In this manner, the controller 20 can monitor the speed of the prime mover 56.

Further, the prime mover 56, via an output shaft, provides power to a power take-off unit 204, such as an electromagnetic clutch coupled to a gear drive, belt drive, or other means for transferring power from the prime mover 56 to another device. The power take-off unit 204 may include a power input shaft (not shown) coupled to the prime mover 56, and a power output shaft (not shown) coupled to subsystems of the vehicle. When the power take-off unit 204 is in a disabled state no power is transferred from the power input shaft to the power output shaft, and when the power take-off unit 204 is in an enabled state power is transferred from the power input shaft to the power output shaft.

A power take-off controller 206 is coupled to the power take-off unit 204, the power take-off controller 206 operative to selectively enable/disable the power take-off unit 204, thereby selectively coupling the power input shaft to the power output shaft. In one embodiment, the power take-off controller 206 is an electric switch and the power take-off unit 204 is an electromagnetic clutch coupled to a belt-driven pulley system.

The power take-off controller 206 includes a sensor (not shown) for detecting the status (i.e., enabled or disabled) of the power take-off unit 204. In one embodiment, the sensor is in the form of a switch, such as a mechanical or optical switch, where switch contacts are closed when the power take-off unit 204 is in the enabled state. Data from the sensor (e.g., contact closure) is provided to the controller 20 for controlling the system, as described in more detail below.

Also coupled to the power take-off unit 204 is an implement 208, such as a mower deck that includes one or more rotating blades. Other types of implements include, for example, a flail mower, rotary cutter, rotary broom, blower and snow thrower. In the configuration of FIG. 9, implement speed is directly related to the prime mover speed.

A prime mover speed controller 210 is coupled to the prime mover 56 and operative to control prime mover speed. In one embodiment, the prime mover 56 is an internal combustion engine and the prime mover speed controller 210 is a throttle plate controller of the internal combustion engine. The controller 20, based on the sensed speed as provided by the prime mover speed sensor 202, commands the prime mover speed controller 210 to open or close the throttle plate, thereby changing the prime mover speed. Accordingly, the controller 20 can control implement speed by controlling prime mover speed.

For utility vehicles/tractors such as zero turn mowers, regulatory and standard compliance issues may govern the maximum operating speed of vehicle mounted implements. For example, the tip speed of mower blades is limited to 19,000 feet per minute by ANSI B71.4. The state of the art for driving implements is a constant ratio between implement and prime mover. For example, a mower deck is designed not to exceed the maximum allowable tip speed in the worst case tolerance stack up and the high end of the engine speed high idle setting. In practice, however, the engine speed will drop 5-10% simply due to engagement of the deck, and will drop even further during operation. Typically, the gap between high idle engine speed and the peak power engine speed approaches 20%. The result is that the tip speed during operation is 10-20% less than the maximum allowable.

For many implements, limiting implement speed limits the operating capability of the implement. In addition, end users may place value on having the highest possible operating speed available in their equipment. For example, in the mowing market many people generally believe that "tip speed=quality of cut".

Figure 10:
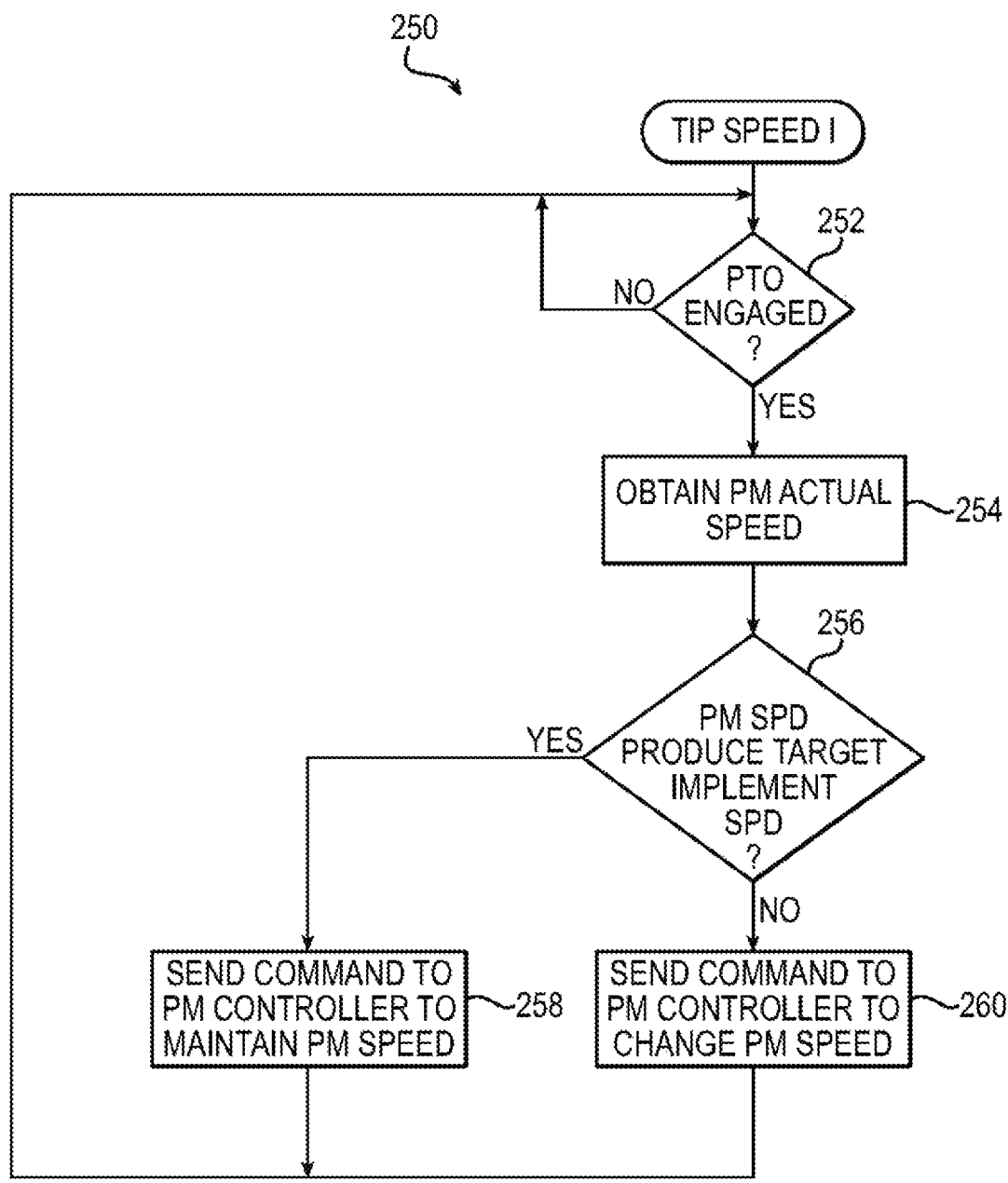
FIG. 10 is a flow chart illustrating exemplary steps for performing tip speed control using the architecture of FIG. 9.

Referring now to FIG. 10, illustrated is a flow chart 250 that includes exemplary steps for controlling implement speed in the system of FIG. 9. The steps shown in FIG. 10 may be executed by the controller 20.

Beginning at block 252, the status of the power take-off unit 204 is determined, for example, using the sensor within the power take-off controller 206. If it is determined the power take-off unit 204 is disabled, the process loops at block 252. However, if the power take-off unit 204 is enabled, then at block 254 the actual speed of the prime mover 56 is determined. The speed may be determined, for example, from data provided by the prime mover speed sensor 202.

Next at block 256 the actual speed of the prime mover is compared to a target speed. The prime mover target speed may be a predetermined speed based on a known mechanical ratio between the prime mover output shaft and the power take-off unit output shaft. For example, from the known mechanical ratio it can be determined that in order to maintain an implement speed of 19,000 feet per minute the prime mover must operate at 4000 revolutions per minute. If at block 256 the prime mover actual speed is at the prime mover target speed, then at block 258 the prime mover speed controller 210 is commanded to maintain the prime mover speed, and then the method moves back to block 252 and repeats. Alternatively, if at block 256 the prime mover actual speed is not equal to the prime mover target speed, then at block 260 the prime mover speed controller 210 is commanded to increase or decrease the prime mover speed to obtain the target speed, and then the method moves back to block 252 and repeats. Alternatively, the system may be configured to reduce prime mover speed only when the implement speed is above a specified limit.

Accordingly, in the embodiments shown in FIGS. 9 and 10 implement speed is maintained at the optimal speed by controlling the speed of the prime mover 56.

Figure 11:
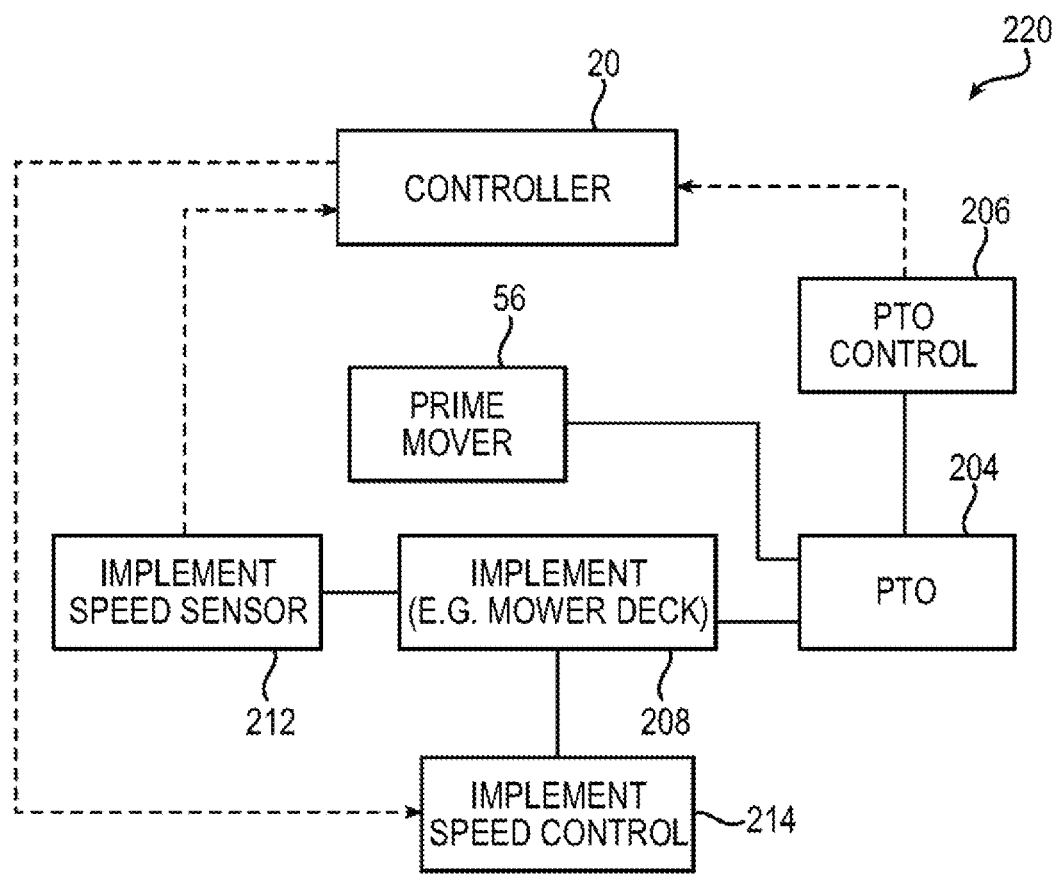
FIG. 11 is a block diagram illustrating exemplary architecture that can be used to implement tip speed control in accordance with another aspect of the disclosure.

Moving now to FIG. 11, a block diagram is provided that illustrates another exemplary architecture 220 for tip speed control for use with a vehicle in accordance with the present disclosure. Like the embodiment shown in FIG. 9, the architecture of FIG. 11 includes a prime mover 56, power take-off unit 204, power take-off controller 206, implement 208 and controller 20. The prime mover 56, power take-off unit 204, power take-off controller 206 and implement 208 may be the same as those described in FIG. 9 and therefore these components will not be described again here. The prime mover 56, however, does not require an associated prime mover speed controller or a prime mover speed sensor. Instead, the prime mover 56 is commanded to operate at a fixed speed, for example, based on a throttle position as set by a user. In such configuration, it is possible that the prime mover speed will not be optimal or may drift based on external influences, e.g., enabling or disabling the implement, the throttle setting being less than maximum, ambient conditions, etc. As a result, the implement speed may not be at the optimal speed and/or may drift from the optimal speed.

In accordance with the embodiment of FIG. 11, an implement speed sensor 212 is coupled to the implement and is operative to detect a speed of the implement. The implement speed sensor 212 converts the detected implement speed into a form readable by the controller 20 (e.g., analog, digital, optical, etc.). The implement speed sensor 214 may be a tachometer, encoder, resolver or other speed sensing device. In addition, an implement speed controller 214 is operatively coupled to the implement 208, the implement speed controller 214 configured to vary a drive ratio between the implement 208 and the power take-off unit 204. In one embodiment, the implement speed controller 214 comprises a continuously variable transmission. By altering a drive ratio between the implement 208 and the power take-off unit 206, implement speed can be maintained at an optimal level or below an allowable level, even when prime mover speed droops or varies. This allows the implement to run near optimal speed during normal operation, rather than to operate at allowable implement speed when engine speed is a maximum (a condition that rarely, if ever, occurs).

Figure 12:
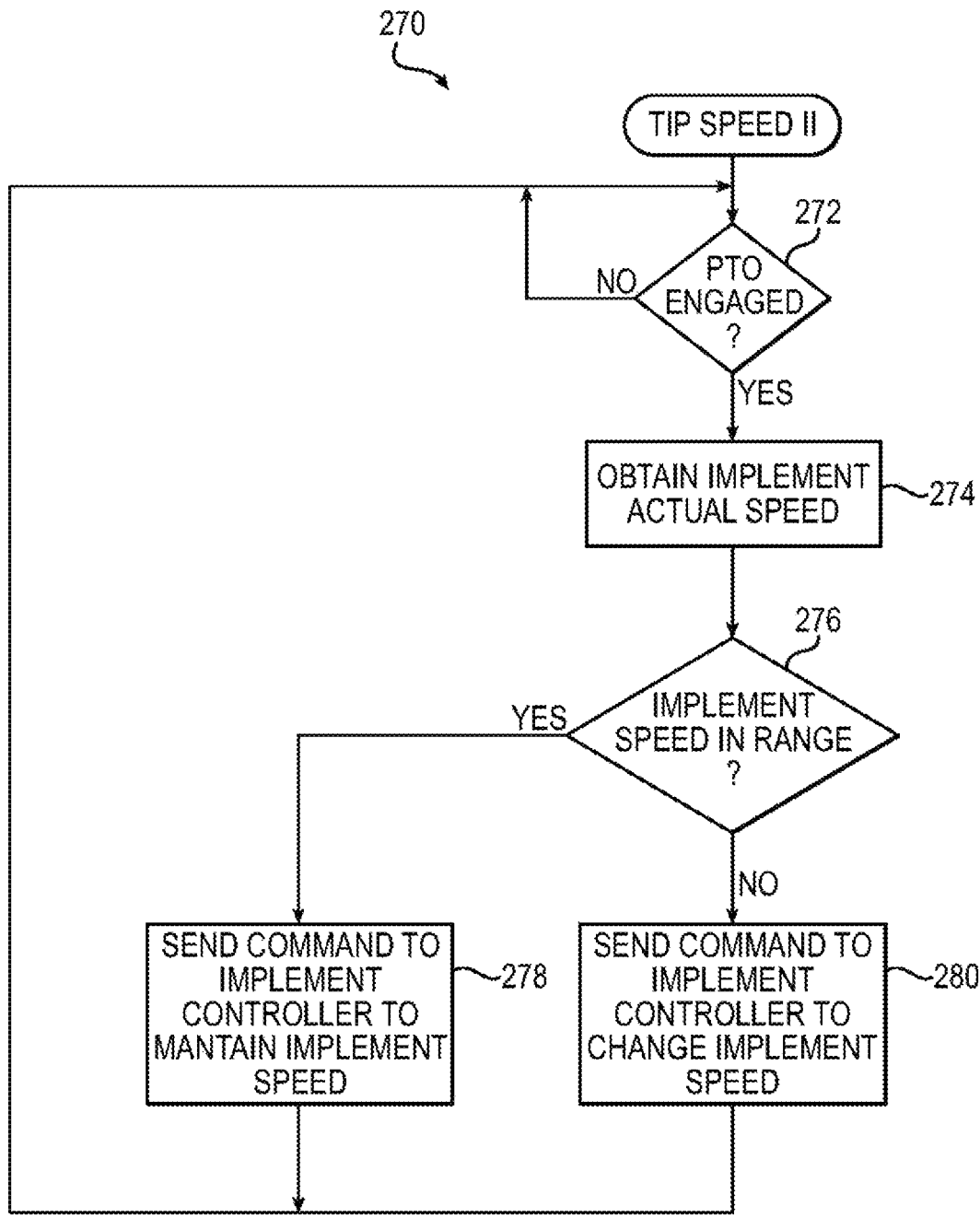
FIG. 12 is a flow chart illustrating exemplary steps for performing tip speed control using the architecture of FIG. 11.

With reference to FIG. 12, illustrated is a flow chart 270 that includes exemplary steps for controlling implement speed using the architecture shown in FIG. 11. The steps shown in FIG. 12 may be executed by the controller 20.

Beginning at block 272, the status of the power take-off unit 204 is determined, for example, using the sensor within the power take-off controller 206. If it is determined the power take-off unit 204 is disabled, the method loops at block 272. However, if the power take-off unit 204 is enabled, then at block 274 the actual speed of the implement 208 is determined. The speed may be determined, for example, from data provided by the implement speed sensor 212.

Next at block 276 the actual speed of the implement 208 is compared to a target speed. The implement target speed may be a predetermined speed based on a maximum allowable speed, or may be based on operator input. If at block 276 the implement actual speed is at the target speed, then at block 278 the implement speed controller 214 is commanded to maintain the ratio between the implement 208 and the prime mover 56, and the method moves back to block 272 and repeats. However, if at block 276 the implement actual speed is not at the target speed, then at block 280 the implement speed controller 214 is commanded to increase or decrease the mechanical ratio between the implement 204 and the prime mover 56 so as to achieve the target implement speed, and then the method moves back to block 272 and repeats.

Accordingly, in the embodiments shown in FIGS. 11 and 12 implement speed is maintained at the optimal speed or below allowable speed by controlling a drive ratio between the implement 208 and the prime mover 56.

Figure 13:
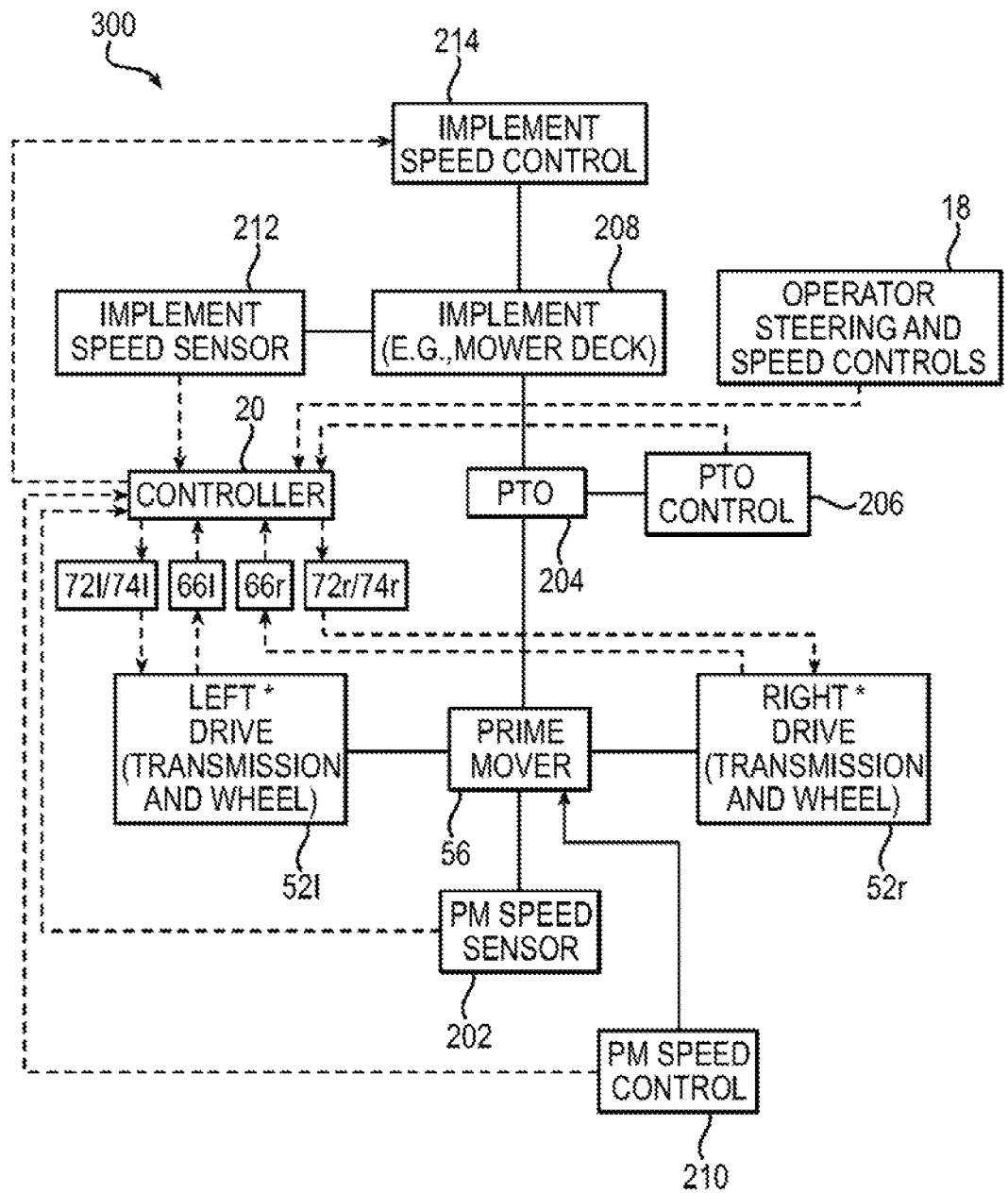
FIG. 13 is a block diagram illustrating exemplary architecture for implementing cruise control in accordance with one aspect of the disclosure.

Moving now to FIG. 13, a block diagram is provided that illustrates another exemplary architecture 300 for a vehicle in accordance with the present disclosure. Like the previous embodiments, the architecture of FIG. 13 includes a prime mover 56, power take-off unit 204, power take-off controller 206, implement 208 and controller 20. The prime mover 56, power take-off 204, power take-off controller 206 and implement 208 may be the same as those described in FIG. 9 and therefore these components will not be described again here.

The prime mover 56 is coupled to left and right trans missions, such as hydrostatic transmissions 52$l$ and 52$l$ coupled to a left and right wheels, respectively (not shown). More specifically, an output shaft of the prime mover 56 may be coupled to an input shaft of left and right fluid pumps as described herein. The left transmission 52$l$ controls delivery of power to the left wheel while the right transmission 52$r$ controls delivery of power to the right wheel. The prime mover also may optionally have a speed sensor 202 for detecting a speed of the prime mover 56 and communicating the detected speed to the controller 20.

The controller 20 is operatively coupled to the left and right pumps so as to control power output by the hydrostatic transmissions 52$l$ and 52$r$. For example, and as described herein, the controller 20 is operatively coupled to a fluid power control device 72$l$ or 74$l$ to selectively control the delivery of fluid power to a left swashplate 64$l$ of the left fluid pump 54$l$. A similar configuration is provided for the right fluid pump 54$r$. In this manner, the controller 20 can control power output by the left and right transmissions 52$l$ and 52$r$ independent of user input. Additionally, the position of the left and right swashplates 64$l$ and 64$r$ may optionally be communicated to the controller via left and right angle sensors 66$l$ and 66$r$ as described herein. Based on the detected swashplate position, the controller 20 can adjust the fluid power provided to the respective swashplate. The controller 20 may optionally receive implement speed data from implement speed sensor 212, and optionally provide commands to implement controller 214 as described in embodiment of FIG. 11.

Operator controls 18, such as speed controls, steering controls, etc., can be provided to the controller 20. The controller 20, for example, based on operator input via the operator controls can command the swashplates 64$l$ and 64$r$ to provide a desired power output from the hydrostatic transmissions 52$l$ and 52$r$, as described in more detail with respect to FIGS. 14 and 15.

Figure 14:
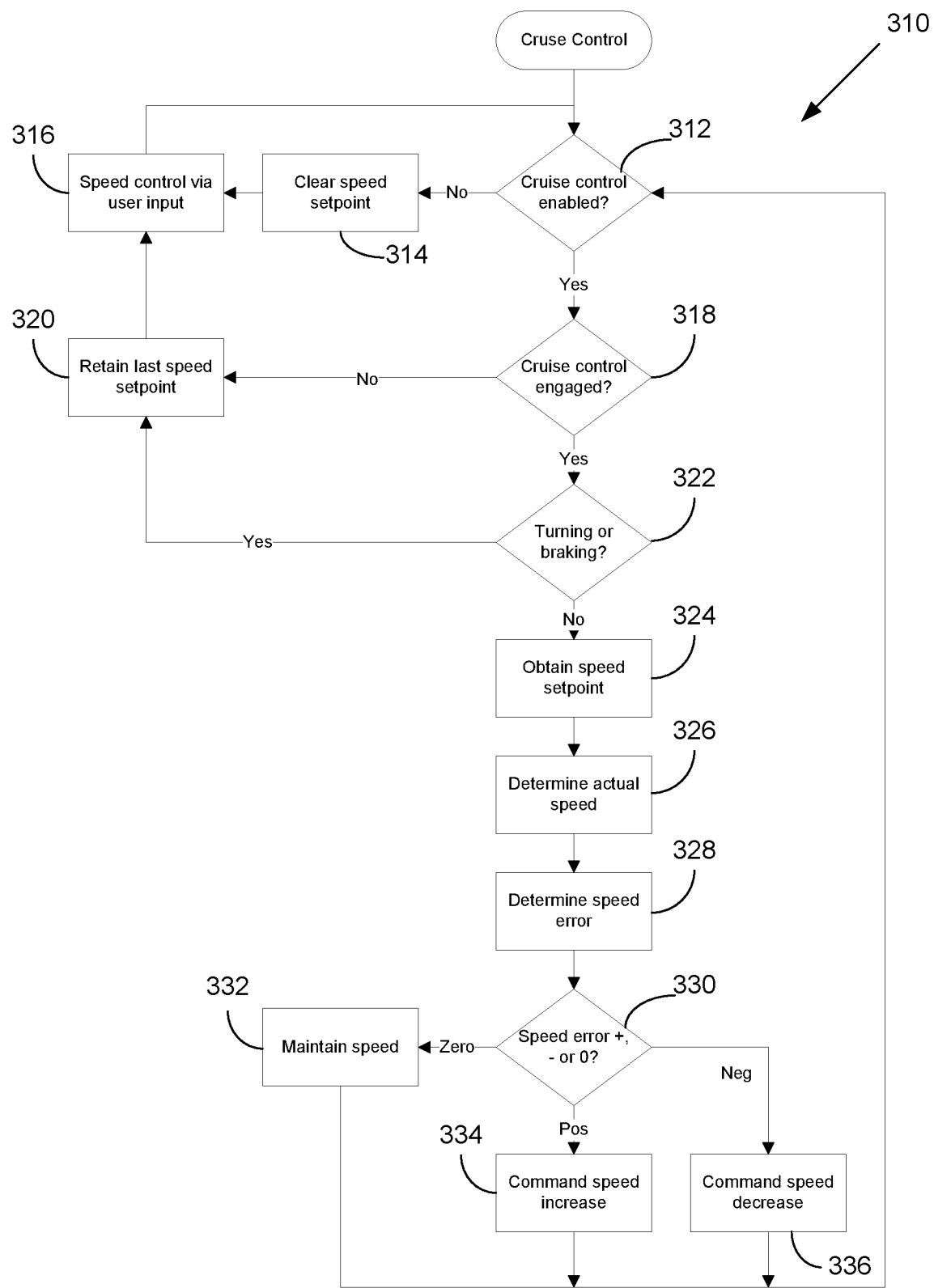
FIG. 14 is a flow chart illustrating exemplary steps for performing cruise control using the architecture of FIG. 13.

Referring to FIG. 14, a flow chart 320 illustrating exemplary steps for implementing cruise control using a pump control system is provided. As will be appreciated, cruise control enables a user to select a speed of the vehicle and once engaged, the vehicle will remain at the set speed.

Beginning at block 312, the system determines if cruise control is enabled. Cruise control can be enabled or disabled, for example, via a selector switch, pushbutton, operator interface, etc. accessible by an operator of the vehicle. Such input may form part of the operator controls 18. If cruise control is not enabled, then at block 314 any speed setpoint that may be stored in memory is cleared, and at block 316 speed control of the vehicle is under control of the user (e.g., via the operator speed controls). The method then moves back to block 312 and repeats.

If at block 312 cruise control is enabled, then at block 318 it is determined if cruise control is engaged. Like enabling/disabling cruise control, the feature also can be engaged/disengaged via operator input (e.g., a set or resume pushbutton or other input means). Further, cruise control may be disengaged by certain operator actions, such as pressing on a brake pedal or placing the vehicle in neutral. If cruise control is disengaged, then at block 320 the speed set point when cruise control was last engaged is stored in memory, and the method moves to block 316 as described above. However, if at block 318 cruise control is engaged, then at block 322 it is determined if the vehicle is performing a turn operation. Determining whether or not the vehicle is turning can be based, for example, on user input (e.g., steering controls), wheels speed feedback, swashplate position, etc. If at block 322 it is determined the vehicle is turning, then the method moves to block 320 and 316 as described above (i.e., speed control is via user input). However, if is determined the vehicle is not turning, then at block 324 a speed setpoint is obtained. The speed setpoint may be obtained in any one of a number of ways. For example, the user may obtain a desired speed of the vehicle using the operator speed controls, and then push a button indicating the current speed is the cruise control speed setpoint. Such button, for example, may be a conventional button (e.g., a push button) or a soft button (e.g., a button on a touch screen).

Once the speed setpoint has been set, then at block 326 the actual speed of the vehicle is determined. Such actual speed may be determined from speed sensors on the wheels, or inferred from operator controls and/or swashplate position. Having obtained the speed setpoint and the actual vehicle speed, a speed error is calculated based on the difference between the speed setpoint and the actual speed, as indicated at block 328. At block 330, the speed error is analyzed to determine if the vehicle speed is correct, needs to be increased, or needs to be decreased. If the actual speed matches the speed setpoint (or is within a predetermined range of the setpoint), then no correction is necessary and the current speed is maintained as indicated at block 332. If at block 330 the actual speed is less than the speed set point, then at block 334 a command is issued to increase the speed. Moving back to block 330, if the actual speed is greater than the speed set point, then at block 336 a command is issued to decrease the speed. The speed commands may be made to the prime mover 56 (e.g., via a prime mover speed controller as shown in FIG. 9), or the swashplate for each pump (e.g., via fluid control devices 72 and 74 as shown in FIG. 13).

Accordingly, the controller 20 can control a characteristic of the vehicle, such as speed, independent of user commands. In this regard, the controller 20 can vary a swashplate position through the application of hydraulic power to the swashplate.

Figure 15:
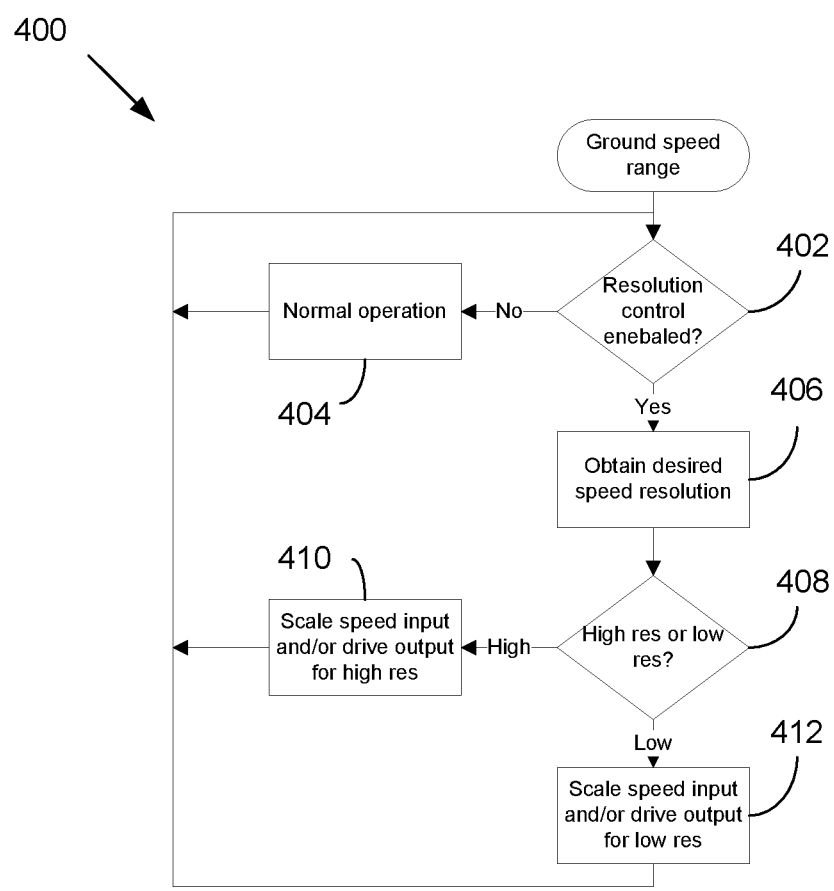
FIG. 15 is a flow chart illustrating exemplary steps for performing ground speed range control using the architecture of FIG. 13

Moving now to FIG. 15, a flowchart 400 is illustrated for implementing ground speed range control using the architecture of FIG. 13. Ground speed range control allows the operator to select various ranges of ground speed operation, trading maximum ground speed for ground speed control resolution as appropriate for the current operation and conditions. For example, when driving for a significant distance maximum ground speed is desirable to minimize travel time. For trimming around mulch beds, however, fine speed resolution is desired to enhance controllability, allowing trimming without scattering mulch, yet close enough to eliminate the need for secondary hand trimming. Ground speed range control allows the operator to select (and change upon command) the maximum ground speed, which is then scaled across the full range of control travel, increasing/decreasing ground speed resolution. For vehicles that use drive wheel speed differential to accomplish steering (e.g., zero turn mowers), steering resolution also can be enhanced.

Beginning at block 402 it is determined if normal control or modified control is enabled. Such determination can be based, for example, on operator input provided to the controller, e.g., a switch, toggle pushbutton, operator interface entry, etc. If normal operation is selected, then at block 404 system control is unchanged and the method moves back to block 402. If enhanced resolution is selected, then at block 406 it is determined if high speed/low resolution or low speed/high resolution is desired. Such determination again can be made based on operator input. For example, a selector switch may have a high speed setting and a low speed setting. The controller 20 may receive data from the selector switch and determine the desired setting. Alternatively, the desired range control may be based on an entered maximum speed, which may be entered via an operator interface or selector switch.

At block 408 the desired speed resolution is determined. If high resolution control is desired (e.g., low maximum speed), then at block 410 maximum deflection of the operator speed control input is associated with a low speed, and all lower speed requests are scaled accordingly. For example, if the maximum speed is selected to be 5 MPH, then at full deflection of the operator speed input the vehicle speed will be 5 mph, and at 50% deflection of the operator speed input the vehicle speed will be 2.5 mph. If, on the other hand, low resolution (high speed) is desired, then at block 412 maximum deflection of the operator speed control input is scaled to the desired high speed, and all lower speed requests are scaled accordingly. For example, if the maximum speed is selected to be 12 MPH, then at full deflection of the operator speed input the vehicle speed will be 12 MPH, and at 50% deflection of the operator speed input the vehicle speed will be 6 MPH. Once the speed range has been scaled, the method moves back to block 402.

Another feature that may be implemented in accordance with the present disclosure is optimal operating point control. This feature allows a prime mover in the form of an internal combustion engine to operate at an optimal operating point (e.g., max efficiency, max power, min fuel consumption, etc.), while varying wheel speeds and implement speeds in order to be consistent with the operator's desired operation commands and pre-defined optimal operating points for prime mover speed and implement speed. In operation, a user provides input for speed and steering of the vehicle, and the controller algorithm adjusts drive speed controls, implement speed controls, etc., to maintain the engine at the optimal operating point. Engine control (fuel flow which drives speed, etc.) may be employed to enhance the system.

Figure 16:
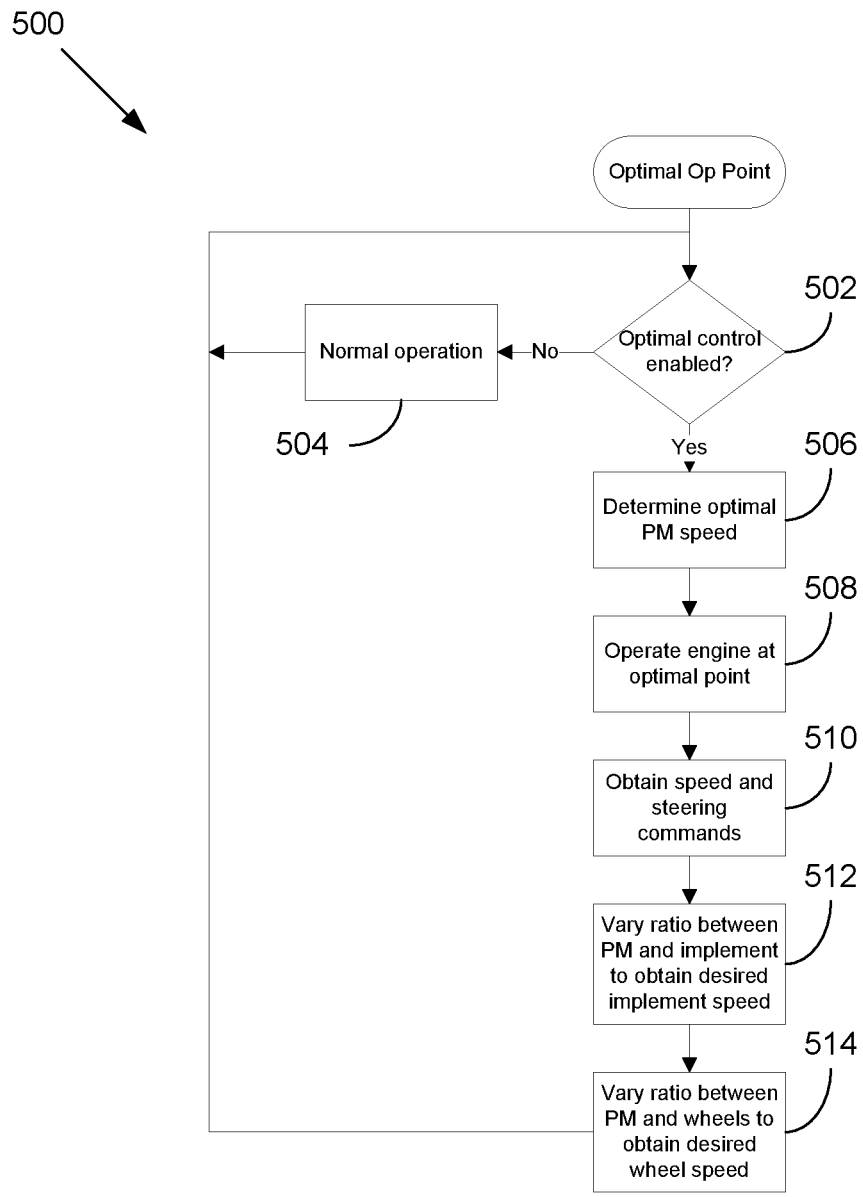
FIG. 16 is a flow chart illustrating exemplary steps for performing optimal operating point control using the architecture of FIG. 13.

FIG. 16 illustrates a flow chart 500 for implementing optimal operation point control using the architecture of FIG. 13. When implementing optimal operation pint control, wheel speed and/or implement speed are varied to obtain the optimal prime mover speed. In certain instances this may lead to lower wheel speed and/or lower implement speed in order to maintain the optimal prime mover speed.

Beginning at step 502 it is determined if optimal operating point control is enabled. Such determination can be based on operator input via, for example, a selector switch, pushbutton, operator interface or other input means operatively coupled to the controller 20. If optimal operating point control is not enabled, then at block 504 normal control is implemented and the process moves back to block 502. If at block 502 optimal control is enabled, then at block 506 the optimal prime mover speed is obtained.

The optimal prime mover speed (revolutions per minute) may be determined beforehand (e.g., in a laboratory or during design) and stored in memory of the controller 20. The optimal operating speed may vary depending on ambient conditions and/or system conditions. Thus, a plurality of optimal operating speeds may be stored in memory of the controller 20, such as in a lookup table or database along with corresponding ambient conditions and system conditions. Then, based on one or more ambient conditions (e.g., ambient air temperature, humidity, barometric pressure) and/or system conditions (e.g., prime mover temperature, oil temperature, etc.) an optimal operating speed for the prime mover 56 can be retrieved from memory of the controller 20. At block 508 the prime mover 56 is operated at the optimal speed by providing a command to the prime mover speed control 210 and monitoring data provided by the prime mover speed sensor 202.

Next at block 510 the desired vehicle speed and/or steering commands are determined, for example, from the user controls 18. For example, if the speed input is displaced 50% of its maximum value, then the requested speed can be inferred to be 50% of rated speed.

Since optimal speed for the prime mover 56 may be less than its maximum speed, in order for the implement speed and wheel speed to achieve their rated speeds it may be necessary to alter a gear ratio between the prime mover 56 and the implement 208 and a gear ratio between the prime mover 56 and the hydrostatic transmission 52 and/or wheels 20. For example, if the prime mover has a maximum speed of 3600 RPM and a 1:1 gear ratio between the prime mover 56 and the implement 208 provides optimum implement speed at the maximum prime mover speed, then if the optimal prime mover speed for the specific ambient and/or system condition is determined to be 2500 RPM, at block 512 the implement speed controller 214 would change the drive ratio between the prime mover 56 and the implement 208 (e.g., to 1.44:1).

Similarly, at block 514 if the vehicle rated speed is 10 MPH while the prime mover is operating at maximum speed (e.g., 3600 RPM) with a 20:1 gear ratio between the prime mover and the wheels, then the optimal 2500 RPM prime mover speed will prevent the vehicle from reaching the rated speed. In order to overcome this barrier, the gear ratio between the prime mover and the transmission and/or wheels can be changed to 15:1. Such gear ratio changes between the prime mover/implement and between the prime mover/transmission/wheels may be implemented, for example, using a CVT.

Another feature that may be implemented in accordance with the present disclosure is four-wheel steering, without the need for complicated mechanical linkages which often deliver less than optimal performance due to wear, free play, and non-linear effects of tolerance stackups. On vehicles that commonly employ two castering wheels and steer by means of the relative speed of the drive wheels, this type of system eliminates the issues associated with castering wheels that offer no lateral restraining forces.

In accordance with the present embodiment, an operator provides input for the desired steering operation and the controller algorithm adjusts the speed of each wheel and the steering attitude of the steerable wheels to produce the desired steering operations. In this embodiment each steerable wheel's attitude is monitored and controlled individually.

Figure 17:
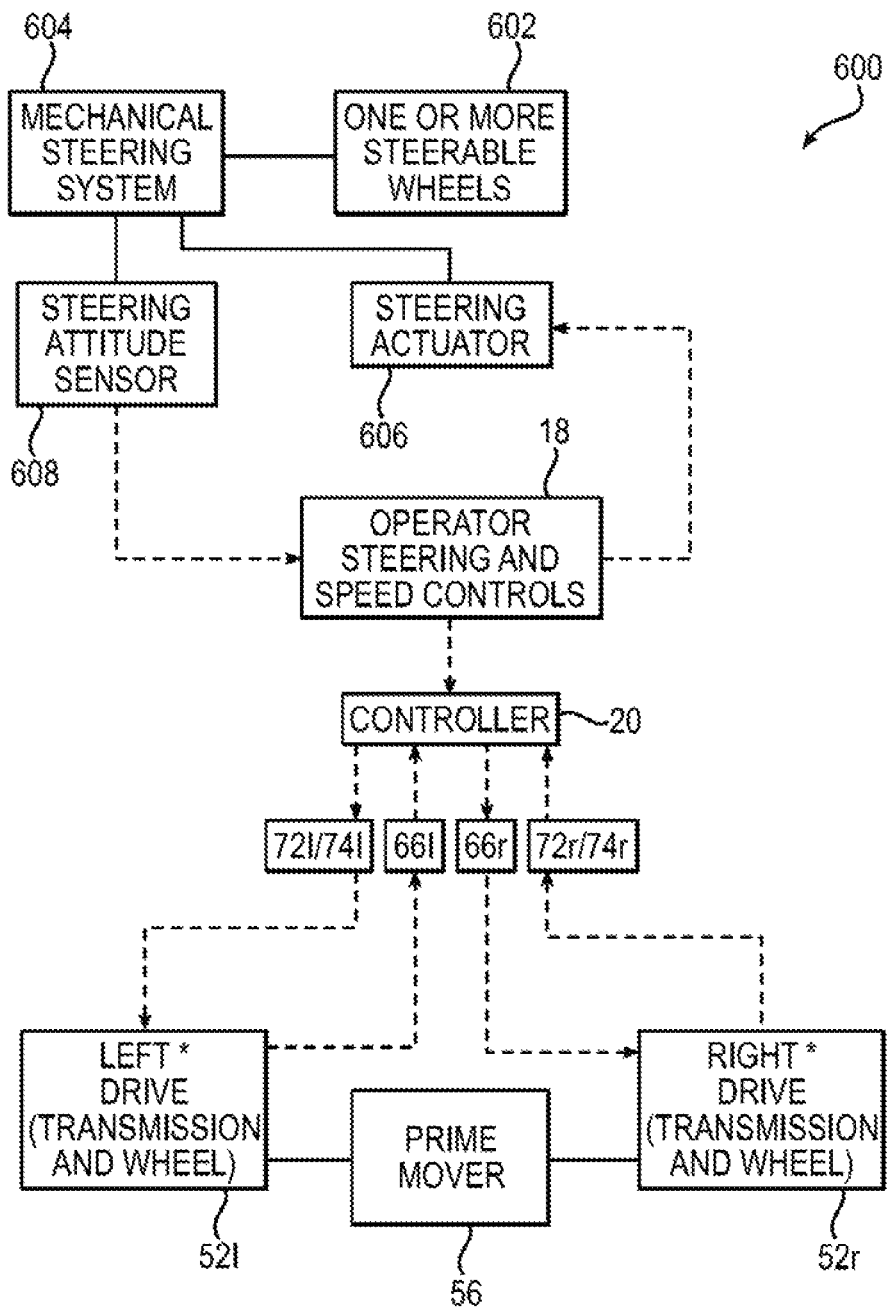
FIG. 17 is a block diagram illustrating exemplary architecture for implementing four-wheel steering in accordance with one aspect of the disclosure.

Referring to FIG. 17, a block diagram is provided that illustrates an exemplary architecture 300 for implementing four-wheel steering control of a vehicle in accordance with the present disclosure. The vehicle implementing the architecture of FIG. 17 includes non-driven front steering wheels and driven rear wheels (e.g., via independent hydrostatic transmissions). The architecture of FIG. 17 includes a prime mover 56, such as an internal combustion engine, electric motor, or the like, mechanically coupled to left and right transmissions, such as hydrostatic transmissions 52*l* and 52*l* coupled to a left and right wheel, respectively (not shown). More specifically, an output shaft of the prime mover 56 may be coupled to an input shaft of left and right fluid pumps as described herein. The left transmission 52*l* controls the delivery of power to the left wheel while the right transmission 52*r* controls delivery of power to the right wheel.

The controller 20 is operatively coupled to the left and right pumps so as to control power output by the hydrostatic transmissions 52*l* and 52*r*. For example, and as described herein, the controller 20 is operatively coupled to a fluid power control device 72*l* or 74*l* to selectively control the delivery of fluid power to a left swashplate 64*l* of the left fluid pump 54*l*. A similar configuration is provided for the right fluid pump 54*r*. In this manner, the controller 20 can control power output by the left and right transmissions 52*l* and 52*r* independent of user input. Additionally, the position of the left and right swashplates 64*l* and 64*r* may be communicated to the controller via left and right angle sensors 66*l* and 66*r* as described herein. Based on the detected swashplate position, the controller 20 can adjust the fluid power provided to the respective swashplate.

Operator controls 18, such as speed controls, steering controls, etc., can be provided to the controller 20. The controller 20, for example, based on operator input via the operator controls, can command the swashplates 64*l* and 64*r* to provide a desired power output from the hydrostatic transmissions 52*l* and 52*r*, as described in more detail with respect to FIG. 19.

One or more steerable wheels 602 are coupled to a mechanical steering system 604. The mechanical steering system 604 may comprise, for example, an electric or hydraulic-assist unit coupled to associated linkage operative to turn the one or more wheels about an axis. A steering actuator 606 delivers power to the assist unit based on commands from the controller 20. A steering attitude sensor 608 is coupled to the steering system 604 and detects the attitude of the one or more wheels relative to a predetermined value and communicates the attitude to the controller 20. The attitude sensor may be coupled to the steering system 604 or directly coupled to a respective steerable wheel 602.

In the architecture of FIG. 17 where the rear wheels provide drive power and steering, while the front wheels provide steering (i.e., no power). Steering is effected by creating a speed differential between the driven wheels, and rotating the one or more steerable wheels about an axis.

All wheel or four wheel drive could be accomplished by adding individual drives to the steerable wheels and providing control in a manner similar to that performed with the main drives. Drive power could be electric, hydraulic, pneumatic, etc.

Figure 18:
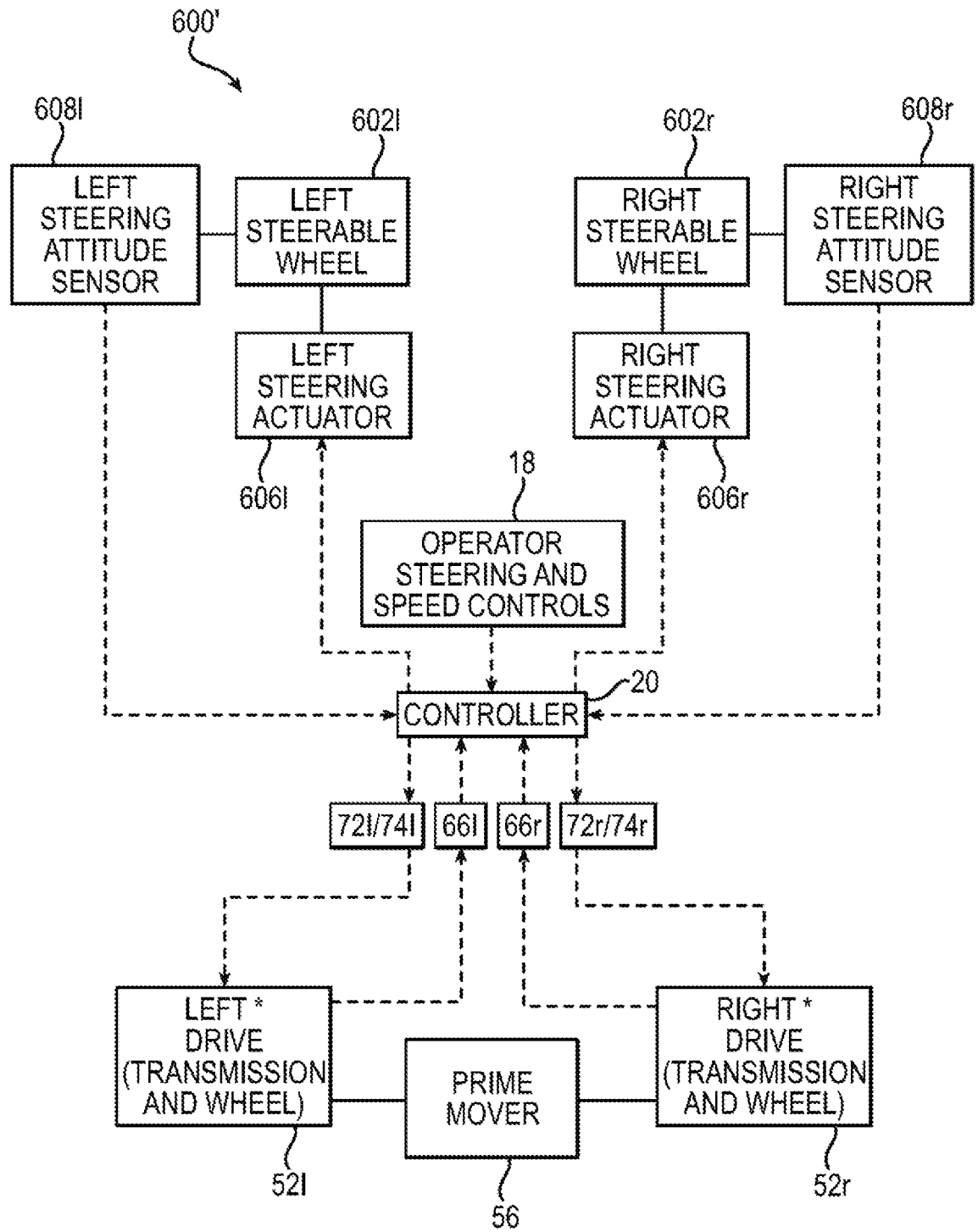
FIG. 18 is a block diagram illustrating exemplary architecture for implementing four-wheel steering in accordance with another aspect of the disclosure.

FIG. 18 is a block diagram illustrating an alternative architecture 600' for implementing four-wheel steering control of a vehicle in accordance with the present disclosure.

The architecture 600' is similar to that of FIG. 17, but instead of including mechanical steering linkage coupled to one or more wheels, the architecture of FIG. 18 can utilize individual steering actuators for each steerable wheel. A left wheel 602*l* is coupled to a left steering actuator 506*l*, which in turn is coupled to the controller 20. A left steering attitude sensor 608*l* is coupled to the left steerable wheel 602*l* and provides wheel attitude to the controller 20. A similar arrangement is provided to a right wheel 602*r*, where a right steering actuator 606*r* is coupled to the right steerable wheel 602*l* and receives commands from controller 20, and a right steering attitude sensor 608*r* is coupled to the right wheel 602*r* and provides the wheel attitude to the controller 20.

Figure 19:
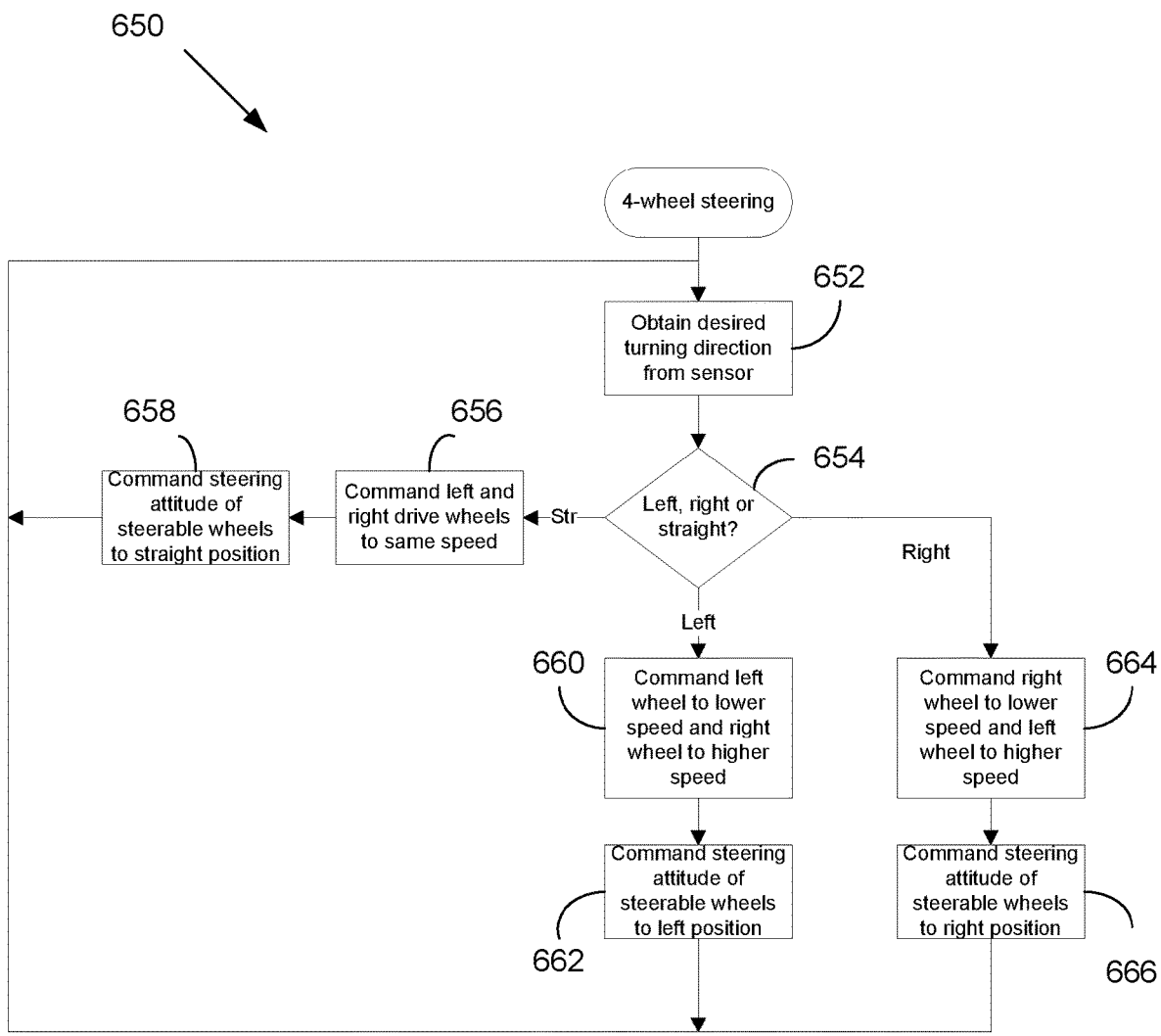
FIG. 19 is a flow chart illustrating exemplary steps for performing four-wheel steering using the architecture of FIG. 17 or 18.

Referring now to FIG. 19, illustrated is a flow chart 650 for performing four-wheel steering in accordance with an aspect of the disclosure. Beginning at block 652, a desired turning direction for the vehicle is determined. The turning direction can be determined based on a comparison of the wheels coupled to each hydrostatic transmission. For example, if the driven wheels are rotating at the same speed, then it can be presumed that the vehicle is to travel in a straight line. However, if one wheel is rotating faster than the other, it can be concluded that a turn is being performed (e.g., if the right wheel is turning faster than the left wheel, then it can be concluded that a left turn is being performed. Based on the differential between driven wheels, the desired turn radius can be calculated. Alternatively, steering direction may be determined based on user input, e.g., based on a steering wheel or other steering input means that communicates the desired steering radius to the controller.

At block 654, the obtained steering direction is analyzed to determine if the vehicle is to turn left, right or remain straight. If the vehicle is to remain straight (i.e., no turn is being performed), then at block 656 the driven wheels are provided with the same speed command and the steerable wheels are controlled to forward (straight) position. If the vehicle is to turn left, then at block 660 the left wheel is commanded to rotate slower than the right wheel, and at block 662 the steerable wheels are controlled to the left position. Finally, if the vehicle is to turn right, then at block 664 the right wheel is commanded to rotate slower than the left wheel, and at block 666 the steerable wheels are controlled to the right position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vehicle, comprising:
a pump including a swashplate tiltable about a swashplate tilt axis, wherein rotation of the swashplate changes a title angle of the swashplate and effects a change in volumetric displacement of the pump;
a controller operatively coupled to the swashplate to effect rotation of the swashplate, the controller comprising a processor and memory;
a first input for receiving a user-controlled speed control signal;
a second input for receiving user-selected operating modes of the vehicle;
an output for providing a vehicle speed setpoint to effect rotation of the swashplate in order to control a speed of the vehicle; and
logic stored in the memory and executable by the processor, the logic configured to generate the vehicle speed setpoint based on the user-selected speed control signal, and change at least one of the user-controlled speed control signal or the vehicle speed setpoint based on the user-selected operating modes of the vehicle;
the vehicle further comprising:
a first driven wheel arranged on a first side of the vehicle;
a second driven wheel arranged on a second side of the vehicle;
at least one steerable wheel;
at least one steering attitude sensor coupled to the at least one steerable wheel and to the controller, the attitude sensor operative to communicate a steering attitude of the at least one wheel to the controller; and
at least one steering actuator operatively coupled to the at least one steerable wheel and to the controller,
logic configured to command the at least one steering actuator to turn the at least one steerable wheel based on a speed differential between the at least two driven wheels and data provided by the steering attitude sensor.

2. The vehicle according to claim 1, wherein the logic further includes logic configured to account for at least one of the user-controlled speed setpoint or the vehicle speed reference.

3. The vehicle according to claim 1, further comprising a speed input device operatively coupled to the first input, the speed input device operative to generate a signal corresponding to a displacement of the speed input device.

4. The vehicle according to claim 3, wherein the speed input device comprises one of a foot-operated pedal or a hand-operated lever.

5. The vehicle according to claim 1, further comprising a mode control input device operatively coupled to the second input, the mode control input device operative to generate signals corresponding to the operating modes of the vehicle.

6. The vehicle according to claim 5, wherein the mode control device comprises one of a selector switch, a push button or an operator interface.

7. The vehicle according to claim 1, wherein the controller is configured to effect rotation of the swashplate through application of fluid power to the swashplate.

8. The vehicle according to claim 1, further comprising logic configured to automatically control a wheel speed of the vehicle independent of the user-controlled speed setpoint.

9. The vehicle according to claim 8, wherein the logic configured to automatically control wheel speed of the vehicle includes logic configured to detect a turning or braking operation of the vehicle;

control a wheel speed of the vehicle based on the user-controlled speed setpoint during a turning or braking operation; and control a wheel speed of the vehicle independent of the user-controlled speed setpoint absent a turning and braking operation.

10. The vehicle according to claim 1, wherein the at least one steerable wheel comprises a plurality of steerable wheels, each wheel operatively coupled to a respective steering actuator and attitude sensor.

11. The vehicle according to claim 1, further comprising a hydrostatic transmission.

12. A vehicle controller for operating a vehicle including a pump having a swashplate tiltable about a swashplate tilt axis, wherein rotation of the swashplate changes the tilt angle and effects a change in volumetric displacement of the pump, the controller comprising:

a processor and memory;

a first input for receiving a user-controlled speed control signal;

a second input for receiving user-selected operating modes of the vehicle;

an output for providing a vehicle speed setpoint to effect rotation of the swashplate in order to control a speed of the vehicle;

logic stored in the memory and executable by the processor, the logic configured to generate the vehicle speed setpoint based on the user controlled speed control signal, and alter a resolution of at least one of the user-controlled speed control signal or the vehicle speed setpoint based on the user-selected operating modes of the vehicle; and logic configured to command at least one steering actuator to turn at least one steerable wheel based on a speed differential between at least two driven wheels and data provided by a steering attitude sensor.

13. The controller according to claim 12, further comprising logic configured to automatically control a wheel speed of the vehicle independent of the user command.

14. The controller according to claim 13, wherein the logic configured to automatically control wheel speed of the vehicle includes logic configured to detect a turning or braking operation of the vehicle;

control a wheel speed of the vehicle based on the user-controlled speed setpoint during a turning or braking operation; and control a wheel speed of the vehicle independent of the user-controlled speed setpoint absent a turning and braking operation.

* * * * *